(12) United States Patent
Silver

(10) Patent No.: US 8,238,639 B2
(45) Date of Patent: Aug. 7, 2012

(54) METHOD AND SYSTEM FOR DYNAMIC FEATURE DETECTION

(75) Inventor: William M. Silver, Weston, MA (US)

(73) Assignee: Cognex Corporation, Natick, MA (US)

( * ) Notice: Subject to any disclaimer, the term of this patent is extended or adjusted under 35 U.S.C. 154(b) by 1010 days.

(21) Appl. No.: 12/100,100

(22) Filed: Apr. 9, 2008

(65) Prior Publication Data

US 2009/0257621 A1    Oct. 15, 2009

(51) Int. Cl.
*G06K 9/00*    (2006.01)

(52) U.S. Cl. ......... 382/141; 382/103; 382/195; 382/151

(58) Field of Classification Search ............... 382/103, 382/195, 141–151

See application file for complete search history.

(56) References Cited

U.S. PATENT DOCUMENTS

| | | | |
|---|---|---|---|
| 3,069,654 A | 12/1962 | Hough | |
| 4,218,615 A | 8/1980 | Werner | |
| 4,224,515 A | 9/1980 | Terrell | |
| 4,390,873 A | 6/1983 | Kirsch | |
| 4,521,772 A | 6/1985 | Lyon | |
| 4,751,505 A | 6/1988 | Williams et al. | |
| 4,920,260 A | 4/1990 | Victor et al. | |
| 4,922,236 A | 5/1990 | Heady | |
| 5,274,361 A | 12/1993 | Snow | |
| 5,578,813 A | 11/1996 | Allen et al. | |
| 5,644,139 A | 7/1997 | Allen et al. | |
| 5,786,804 A | 7/1998 | Gordon | |
| 5,932,862 A | 8/1999 | Hussey | |
| 5,942,741 A | 8/1999 | Longacre | |
| 5,960,125 A | 9/1999 | Michael | |
| 6,175,644 B1 | 1/2001 | Scola et al. | |
| 6,175,652 B1 | 1/2001 | Jacobson et al. | |
| 6,433,780 B1 | 8/2002 | Gordon | |
| 6,483,935 B1 | 11/2002 | Rostami et al. | |
| 6,658,145 B1 | 12/2003 | Silver et al. | |
| 6,690,842 B1 | 2/2004 | Silver et al. | |
| 6,816,755 B2 | 11/2004 | Habibi | |
| 7,016,539 B1 | 3/2006 | Silver et al. | |

(Continued)

FOREIGN PATENT DOCUMENTS

DE    4035039    11/1993

(Continued)

OTHER PUBLICATIONS

Ahlberg et al., "Handbook of face recognition," Chapter 4, Parametric Face Modeling and Tracking, Springer, New York, US Jan. 1, 2005, 65-87.

(Continued)

*Primary Examiner* — Gregory J Toatley
*Assistant Examiner* — Iyabo S Alli

(57) ABSTRACT

Disclosed are methods and systems for dynamic feature detection of physical features of objects in the field of view of a sensor. Dynamic feature detection substantially reduces the effects of accidental alignment of physical features with the pixel grid of a digital image by using the relative motion of objects or material in and/or through the field of view to capture and process a plurality of images that correspond to a plurality of alignments. Estimates of the position, weight, and other attributes of a feature are based on an analysis of the appearance of the feature as it moves in the field of view and appears at a plurality of pixel grid alignments. The resulting reliability and accuracy is superior to prior art static feature detection systems and methods.

22 Claims, 12 Drawing Sheets

U.S. PATENT DOCUMENTS

| | | | |
|---|---|---|---|
| 7,167,161 | B2 | 1/2007 | Ahn |
| 7,175,090 | B2 | 2/2007 | Nadabar |
| 7,265,339 | B1 | 9/2007 | Ng et al. |
| 2005/0275831 | A1 | 12/2005 | Silver |
| 2005/0276445 | A1 | 12/2005 | Silver |
| 2007/0146491 | A1* | 6/2007 | Tremblay et al. ........ 348/211.99 |
| 2008/0309920 | A1 | 12/2008 | Silver |
| 2008/0310676 | A1 | 12/2008 | Silver |
| 2009/0121027 | A1 | 5/2009 | Nadabar |
| 2009/0297016 | A1* | 12/2009 | Levenson et al. ............. 382/133 |
| 2010/0155477 | A1 | 6/2010 | Silver et al. |

FOREIGN PATENT DOCUMENTS

| | | |
|---|---|---|
| DE | 202006015262 | 2/2007 |
| EP | 1857978 | 11/2007 |
| WO | 02068900 | 9/2002 |
| WO | 2004003849 | 1/2004 |
| WO | 2005124317 | 6/2005 |
| WO | 2005124709 | 12/2005 |
| WO | 2007035943 | 3/2007 |
| WO | 2007110731 | 10/2007 |
| WO | 2008156616 | 12/2008 |

OTHER PUBLICATIONS

Astech, Applied Sensor Technology et al., "VLM 250 Series—Velocity and Length Sensor", Version 1.0, Mar. 5, 2007.

Astech, Angewandte Sensortechnik G. et al., "Start Up of VLM 200/250 Series", Check List, Version 2.1, 2007, 1-4.

Astech, Angewandte Sensortechnik G. et al., "Technischche Daten—Technical Data", VLM 200A-VLM 200FA, Sep. 30, 2003.

Astech, Angewandte Sensortechnik G. et al., "User Manual", VLM 250, Firmware version 7, Version 2.0, Jan. 17, 2008.

Barron, J.L. et al., "Motion and Structure from Time-Varying Optical Flow", Vision Interface, May 1995.

Braintech, et al., "EVF Brochure", eVisionFactory: The 3D vision evidance software platform Version 4., 2005.

Habibi, Babak, "Community of Businesses Using Support Systems(Cobus)", A Scalable, Distributed, and Decentralized System for Enterprise-Wide Online Electronic Monitoring, diagnostics, and Support, Mar. 11, 2003.

Heinzmann et al., "Robust Real Time Face Tracking and Gesture Recognition", Proceedings of the International Joint Conference on Artificial Intelligence, vol. 2, Jan. 1, 1997.

Horn et al., "Determining Contstant Optical Flow", 2003.

J. Strom, "Model-based face tracking and coding", Dept Electr. Eng. Linkoping University, Linkoping, Sweden XP002542394, Chapters 9-11 section 9.1, 9.2, 10.2, 10.4, 11-1, and 11.4 abstract, 2002.

Sengupta S. et al, "Improved Tracking of Facial Features in head and sholder video sequences" Indian Conference on Computer Vision, Graphics and ImageProcessing, Dec. 16, 2002, pp. 1-5 XP002452798.

Nickels et al., "Estimating uncertainty in SSD-based feature tracking" Image and Vision Computing, Elsevier, Guildford, GB, vol. 20, No. 1, Jan. 1, 2002 pp. 47-58.

International search report and written opinion, PCT/US2009/002198, Mar. 9, 2009.

Cognex Corporation, Cognex 3000/4000/5000, Vision Tools, Revision 7.6, 590-0136, Chapter 10 Auto-Focus 1996.

Cognex Corporation, Cognex 3000/4000/5000, Vision Tools, Revision 7.6, 590-0136, Chapter 13 Golden Template Comparison, 1996.

Kramer et al., "Pulse-Based Analog VLSI Velocity Sensors", IEEE Transactions on Circuits and Systems—II: Analog and Digital Signal Processing, vol. 44, No. 2, Feb. 1997.

Verri et al., "Motion Field and Optical Flow: Qualitative Properties", Massachusetts Institute of Technology, Artificial Intelligence Laboratory and Center for Biological Information Processing, Whitaker College, Dec. 1986.

Wu et al., "Optical Flow Estimation Using Wavelet Motion Model", The Robotics Institute, Carnegie Mellon University, Pittsburg, PA 15213.

Ziou et al., "Edge Detection Techniques—An Overview", 1998.

"International Preliminary Report on Patentability, Application No. PCT/US2009/002198, dated Oct. 9, 2010".

"International Search Report, Application No. PCT/US2009/002198, dated Oct. 15, 2009".

"Amendment to Official Action, European Application No. 09729390.6, dated Jan. 10, 2011".

* cited by examiner

| 1000 | Static Edges (1010) | | | Current Dynamic Edges (1012) | | | | Map Data (1014) | | | Next Dynamic Edges (1016) | | |
|---|---|---|---|---|---|---|---|---|---|---|---|---|---|
| | Pol | Wgt | Pos | Pol | Pos | Age | Exp | Wgt | Force | Offset | Pos | Age | Exp |
| 1021 | − | 1.00 | 2.10 | − | | | | | | | 3716.78 | 1 | 1.00 |
| 1022 | + | 0.90 | 14.20 | + | 3728.70 | 3 | 2.60 | 2.60 | −0.50 | 0.18 | 3728.75 | 4 | 3.50 |
| 1023 | | | | − | 3738.60 | 5 | 3.30 | 0.00 | | | 3738.60 | 6 | 3.30 |
| 1024 | + | 0.92 | 29.70 | + | 3744.70 | 6 | 5.50 | 5.50 | 0.00 | −0.32 | 3744.65 | 7 | 6.42 |
| 1029 | − | 0.24 | 40.60 | − | 3756.50 | 9 | 9.00 | 9.00 | −0.60 | 0.28 | 3756.53 | 10 | 10.00 |
| 1025 | − | 1.00 | 42.10 | | | | | | | | | | |
| 1026 | + | 1.00 | 49.80 | + | 3764.60 | 11 | 10.80 | 10.80 | −0.20 | −0.12 | 3764.59 | 12 | 11.80 |
| 1027 | | | | − | 3774.50 | 14 | 14.00 | 0.00 | | | 3774.50 | 15 | 14.00 |
| 1028 | | | | − | 3780.80 | 16 | 13.80 | 0.00 | | | | | |

| 1050 | | |
|---|---|---|
| Coarse position | 3715.00 | 1052 |
| Common offset | −0.32 | 1054 |
| Global Position | 3714.68 | 1056 |
| Match Score | 0.89 | 1058 |

Fig 10

METHOD AND SYSTEM FOR DYNAMIC FEATURE DETECTION

FIELD OF THE INVENTION

The invention relates to digital image analysis, and more particularly to feature detection and its application to optical measurement of motion.

BACKGROUND OF THE INVENTION

Digital image analysis is used for many practical purposes including, industrial automation, consumer electronics, medical diagnosis, satellite imaging, photographic processing, traffic monitoring, security, etc. In industrial automation, for example, machine vision systems use digital image analysis for automated product inspection, robot guidance, and part identification applications. In consumer electronics, for example, the common optical mouse uses digital image analysis to allow a human to control a cursor on a personal computer screen.

To service these applications, digital images are captured by a sensor, such as an optoelectronic array of photosensitive elements called pixels, and analyzed by a digital information processing device, such as a digital signal processor (DSP) or a general purpose computer executing image analysis software, to extract useful information. One common form of digital image analysis is feature detection. Physical features on objects in the field of view of the sensor (object features) give rise to patterns in the digital images (image features) that can be analyzed to provide information about those object features and the objects that contain them. Example object features might include edges, corners, holes, ridges, and valleys, which give rise to changes in surface depth, orientation, and reflectance. These changes in turn interact with illuminating radiation to produce the image features.

Image features can be detected using many well-known methods, for example edge detection, matched filters, connectivity, Hough transforms, and geometric pattern matching.

Typically, feature detection in digital image analysis is a static process, by which is meant, generally, that features are detected within a single digital image captured at a particular point in time. Equivalently, to reduce noise, static feature detection can be used on an image that is the average of a plurality of images captured from a stationary scene.

In a typical static feature detection system, a one- or two-dimensional digital image of a scene is captured by any suitable means. The image is then analyzed by software implementing a static feature detection technique to identify image features, which comprise a set of attributes that represent measurements of physical properties of corresponding object features. In a two-dimensional edge detection system, for example, edge attributes may comprise a position, an orientation and a weight. The position estimates the location of the edge within the image, and may be determined to sub-pixel precision by well-known means. The orientation estimates the angle of the edge at the estimated position. The weight is an estimate of edge strength and can be used to provide a measure of confidence that the edge truly corresponds to a physical feature in the field of view and not to some artifact of instrumentation. Typically, an edge is considered to exist only if its weight exceeds some value herein called a detection threshold.

In a one-dimensional edge detection system, for example, position and weight can be similarly estimated and generally have the same meaning, but orientation is replaced with polarity, which is a two-state (binary) value that indicates whether the edge is a light-to-dark or dark-to-light transition.

There are a large number of well-known static edge detection systems, including those of Sobel and Canny. Another exemplary 2D static edge detection technique is described in U.S. Pat. No. 6,690,842, entitled APPARATUS AND METHOD FOR DETECTION AND SUB-PIXEL LOCATION OF EDGES IN A DIGITAL IMAGE, by William Silver, the contents of which are hereby incorporated by reference. Generally the literature describes two-dimensional methods, with one-dimensional being a special and simpler case. Static edge detection techniques may utilize gradient estimation, peak detection, zero-crossing detection, sub-pixel interpolation, and other techniques that are well known in the art.

Another example of static feature detection is the Hough transform, described in U.S. Pat. No. 3,069,654 entitled METHOD AND MEANS FOR RECOGNIZING COMPLEX PATTERNS, and subsequently generalized by others. For a Hough transform designed to detect lines in a 2D image, for example, the feature attributes might include position and orientation.

Yet another example of static feature detection is connectivity analysis, where feature attributes might include center of mass, area, and orientation of the principal axes.

All of the information estimated by a static feature detection technique is limited in accuracy and reliability by the resolution and geometry of the pixel grid. This is because the exact alignment between the pixel grid and the physical features that give rise to image features is essentially an accident of the process by which objects or material are positioned in the field of view at the time that an image is captured. Edge weight, for example, varies significantly depending on this accidental alignment, which can result in failing to detect a true edge or falsely detecting an instrumentation artifact. This is particularly likely for edges at the limits of the resolution of the pixel grid-detection of such edges, whether real or artificial, is at the whim of their accidental alignment with the pixel grid.

Position estimates are subject to the same whims of accidental alignment. A competent static edge detector might estimate the position of a strong, well-resolved edge to about ¼ pixel, but it is difficult to do much better. For weaker or inadequately-resolved edges, the accuracy can be substantially worse.

Static feature detection is used in the common optical mouse to track the motion of the mouse across a work surface. Methods in common use are described in, for example, U.S. Pat. No. 5,578,813, entitled FREEHAND IMAGE SCANNING DEVICE WHICH COMPENSATES FOR NON-LINEAR MOVEMENT, U.S. Pat. No. 5,644,139, entitled NAVIGATION TECHNIQUE FOR DETECTING MOVEMENT OF NAVIGATION SENSORS RELATIVE TO AN OBJECT, U.S. Pat. No. 5,786,804, entitled METHOD AND SYSTEM FOR TRACKING ATTITUDE, and U.S. Pat. No. 6,433,780, entitled SEEING EYE MOUSE FOR A COMPUTER SYSTEM. A reference pattern is stored corresponding to physical features on the work surface, where the reference pattern is a portion of a digital image of the surface. The reference pattern is correlated with subsequent digital images of the surface to estimate motion, typically using sum of absolute differences for the correlation. Once motion exceeding a certain magnitude is detected, a new reference pattern is stored. This is necessary because the old reference pattern will soon move out of the field of view of the sensor.

Correlation of this sort is a form a static feature detection. The position of the mouse when a new reference pattern is stored is an accidental alignment of the physical features of the surface with the pixel grid of the sensor, and each time a new reference pattern is stored there will be some error. These errors accumulate proportional to the square root of the number of times a new reference pattern is stored, and quickly become rather large. This is generally not a serious problem for an optical mouse, because a human user serves as feedback loop controlling the motion to achieve a desired effect.

There are a large number of applications for which accurate tracking of the motion of objects or material is of considerable practical value, and where traditional methods of digital image analysis, such as that used in an optical mouse, are inadequate. These applications include numerous examples in industrial manufacturing, including for example the tracking of discrete objects for control of an ink jet or laser printer, and the tracking of material in a continuous web. The most commonly used solution is a mechanical encoder attached to a transport drive shaft, but these have many well-known problems including slip between the drive and the material, resulting in inaccuracies. Systems using laser Doppler technology for direct non-contact measurement of surface speed are available, but they are generally expensive and bulky.

SUMMARY OF THE INVENTION

The present invention overcomes the disadvantages of the prior art by providing a system and method for dynamic feature detection. Dynamic feature detection substantially reduces the effects of accidental alignment of physical features with the pixel grid by using the motion of objects or material in and/or through the field of view to capture and process a plurality of images that correspond to a plurality of alignments. Estimates of the position, weight, and other attributes of a feature are based on an analysis of the appearance of the feature as it moves in the field of view and appears at a plurality of pixel grid alignments. The resulting reliability and accuracy is superior to prior art static feature detection systems and methods.

According to the present invention a dynamic feature comprises information that describes and corresponds to a physical feature or characteristic of an object or material (an object feature), wherein the information is determined by analysis of a plurality of images captured during relative movement between the object or material and the field of view. The information comprises at least one measurement of a physical property of the object feature, for example its position. Individual elements of the information are called attributes or values. In an illustrative embodiment using edges, the information may include position, orientation (2D) or polarity (1D), and weight, each similar to but more reliable and accurate than those of prior art static edge detection. In alternative embodiments, the information may further include other values unanticipated by static feature detection, such as age and variability. In an illustrative embodiment, age is a count of the number of images for which the dynamic feature has appeared in the field of view. Variability attributes are measures of the magnitude of fluctuation of other attributes such as position, weight, and/or orientation, and serve to provide assessments of the reliability of those attributes.

As used herein the term static feature refers to an image feature detected by some suitable static feature detection method or system. The terms static edge and dynamic edge refer respectively to static or dynamic features in an embodiment wherein the features to be detected are edges. In descriptions of such embodiments it will be apparent that other types of features could be used, possibly with different attributes that are more suitable for the type of features chosen.

Motion is a nearly universal characteristic of objects and material in the physical world. Even for objects that come to rest within the field of view of a sensor, the object must have moved in order to reach that point of rest. In industrial manufacturing, for example, objects and material generally move in a known direction along a production line.

The invention takes advantage of the fact that the apparent motion of a feature from one image to the next is generally composed of two principal factors: the physical motion of an object or material in the field of view, and instrumentation artifacts such as accidental alignment with the discrete pixel grid, varying illumination and viewing angles, and others known in the art. The physical component of motion is generally substantially common to all features belonging to the same object, whereas the artificial components are generally substantially uncorrelated. The invention provides image analysis systems and methods for estimating the physical component of motion wherein the instrumentation artifacts substantially cancel out, resulting in estimates of the physical motion that are far more accurate than the estimates of attributes, such as position and orientation, of individual static features.

According to an illustrative embodiment of the present invention, physical motion is described by one or more parameters corresponding to one or more degrees of freedom in which the motion may occur. For example, motion of rigid bodies in a 2D image might be described by three parameters, two of translation and one of rotation. Similarly, motion of a rigid body in a 1D image would be described by one translation parameter. Motion closer to and/or farther away from certain kinds of sensors can be described by a size degree of freedom, since the object would appear larger or smaller as it moved closer or farther. For a 1D sensor of this kind, for example, motion could be described by two parameters, one of translation and one of size.

In general many other well-known degrees of freedom can be used as appropriate to the motion in a given application, including, for example, those of the affine and perspective transformations. Furthermore, the objects need not be rigid bodies as long as the parameters of motion can be defined. The set of parameters used to define the degrees of freedom in a particular embodiment are referred to collectively as the pose of the object or material relative to the field of view, or conversely the pose of the field of view relative to the object or material. The pose provides, for each image, a mapping between points on the object and points in the image.

Certain kinds of motion, such as for example rotation, suggests the use of 2D images. The invention recognizes, however, that embodiments wherein the motion is suitable for 1D images are of considerable and special practical value, and that 1D digital image analysis has been disfavored relative to 2D devices. The practical value arises in part because motion in industrial manufacturing is generally characterized by one degree of freedom along a production line, and in part because 1D systems are capable of much finer time resolution than 2D systems.

Due to its practical importance and also for simplicity of description, the disclosure herein emphasizes embodiments using 1D images with one translation degree of freedom. It will be recognized, however, that embodiments using 2D images, or 1D images with different or additional degrees of freedom, are within the scope of the present invention. Further due to its practical importance and also for simplicity of description, the disclosure herein emphasizes embodiments wherein the features to be detected are edges. It will further be recognized, however, that embodiments based on other kinds of features are within the scope of the present invention.

In some embodiments the objects or material in the field of view are of substantially unknown appearance, i.e. the object features are not known in advance. Dynamic features are created as motion brings new physical features or characteristics into the field of view, are updated responsive to a learning process over a plurality of images as the objects or material move; and may optionally be discarded once the motion carries them substantially beyond the field of view.

In other embodiments a predetermined set of dynamic features is used, corresponding to objects or material of substantially known appearance. The predetermined set of dynamic features may be obtained from a training process that is responsive to a training object; from a CAD or mathematical description; or from any suitable process. For such embodiments, the dynamic feature attributes may include both expected and measured values. The expected attributes may come from predetermined information, while the measured attributes may be initialized whenever an object substantially similar in appearance to the known appearance enters the field of view, and be updated as the object moves. Such embodiments may further include in the set of dynamic feature attributes age and variability.

While some motion is a necessary element of dynamic feature detection, the motion need not be continuous or smooth. Motion may change in magnitude and/or direction arbitrarily and without any prior knowledge or warning. Furthermore, objects may come to rest in the field of view for indefinite periods of time. In all cases, motion is understood to be relative motion between a sensor and an object. Illustrative embodiments of the present invention may be described herein using a stationary sensor and a moving object. It should be noted that in alternative embodiments, the sensor may be in motion while the object is stationary and/or both the object and the sensor may be in motion. As such, the description of a stationary sensor and a moving object should be taken as exemplary only.

In operation, an exemplary dynamic feature detection system or method captures a sequence of images of a field of view and performs static feature detection to identify a set of static features for each captured image. The static feature detection may use any suitable method.

An analysis is performed to determine a map between the static and dynamic features for each captured image. The analysis is advantageously designed to bring the static features into a substantially best alignment with the dynamic features. The map generally has two components: a pose that maps between points on the object and points in the image, and an association that maps dynamic features to corresponding static features. Typically a dynamic feature corresponds to one static feature, but there may be ambiguous cases where a dynamic feature corresponds to more than one static feature, as well as cases where a dynamic feature corresponds to no static feature. In addition to producing a map, the analysis may produce a match score that indicates a degree of confidence that that map is valid, i.e. that the object or material continues to be correctly tracked as it moves.

Using the map, the attributes of dynamic features are updated by a learning process whose details are specific to a given embodiment. One effect of the learning process is to improve the measurements of physical properties of corresponding object features, for example by making them more accurate or reliable.

For embodiments wherein the objects or material are of substantially unknown appearance, dynamic features are created as new physical features or characteristics enter the field of view, are updated by a learning process as they move, and are optionally discarded after they leave the field of view. The terms birth, life, and death are used herein to refer to the processes of creation, updating, and discarding of dynamic features, and these processes are collectively referred to as the life cycle of a dynamic feature.

In illustrative embodiments dynamic features have an attribute called herein experience. In some illustrative embodiments experience may simply be the age of a dynamic feature, which in an illustrative embodiment starts at 0 at birth and increases by 1 for each captured image during its life. In other illustrative embodiments, experience is a combination of age and the weights of static features to which the dynamic feature was found to correspond, so that, for example, dynamic edges corresponding to strong, well-resolved object features tend to gain more experience as they get older than do dynamic edges corresponding to weaker or under-resolved object features.

In illustrative embodiments experience has an important and significant effect on the learning process. Less experienced dynamic features generally have relatively less reliable attributes than more experienced ones. As a consequence, it is desirable that less experienced dynamic features contribute relatively less to the analysis that determines the map and match score, but are influenced relatively more by the learning process that updates attribute data. Likewise, it is desirable that more experienced dynamic features contribute relatively more to the analysis and are influenced relatively less (or not at all) by the learning process. The learning process reduces the magnitude of uncorrelated instrumentation artifacts, resulting in attributes that are more accurate and reliable than can be obtained by prior art static feature detection.

In these illustrative embodiments, since the map is most strongly influenced by experience, and since it most strongly affects less experienced dynamic edges through the learning process, the life cycle of dynamic features has the effect of transferring information from more experienced to less experienced dynamic features. A feature is born, learns its attributes from its elders, passes that information along to the younger generations, and finally dies.

As described above, the analysis that determines the map may compute a match score for each image. In an illustrative embodiment the match score is most strongly influenced by the most experienced dynamic features. In an illustrative embodiment if the match score falls below a certain accept threshold, the map is considered unreliable and the image is otherwise ignored. A more reliable map may be found with the next image. If a certain number of consecutive match scores fall below the accept threshold, or if one such score falls below a certain flush threshold, all dynamic features are discarded and new ones are created from the static features of the current image. In accordance with alternative embodiments, many other rules can be used to handle situations where the map may be unreliable or where tracking of the object may fail altogether.

In some embodiments for which objects or material of substantially known appearance are used, the analysis that determines the map may compute two scores, a match score similar in meaning and use to that described above and indicating confidence in the map, and a detect score that indicates the confidence with which an object similar in appearance to the known appearance is in the field of view. One advantage of such an embodiment is that it may be desirable to recognize and begin to track an object when it is only partially within the field of view, before enough of it is seen to be sure that it is in fact an object of the known appearance. At such times it is desirable to have a measure of confidence in the map (the match score), but to reserve judgment on the identity of the object (detect score) until more is seen.

In some embodiments for which objects or material of substantially known appearance are used, the predetermined set of dynamic features are obtained using a training process that determines those dynamic features from a training object. Since that predetermined set of dynamic features will be used in every image of such an embodiment of dynamic feature detection, it is desirable that the attributes of each dynamic feature in the set be as reliable as is practical, and that only features that are seen relatively consistently over various pixel grid alignments be included in the set. For example, under-resolved features may appear strongly at certain pixel grid alignments but not at others, and their static position are generally not reliable.

In an illustrative embodiment, training on a training object is accomplished by using a dynamic feature detection embodiment designed to operate on unknown objects or material. As will be appreciated, the training object or material remains unknown until such time as it becomes known by the training process itself. In this embodiment, dynamic feature detection on unknown objects or material is run as the training object is moved into the field of view. A signal is received to complete the training process by examining the dynamic features in existence at the time of the signal, choosing those whose attributes indicate reliability, and creating the predetermined set of dynamic features to be used for dynamic feature detection on objects substantially similar in appearance to the training object. The training object may be at rest or in motion at the time of the signal. Reliability may be indicated by average weight, position variability, or any other suitable process that will occur to one of ordinary skill in the art.

One result of the dynamic feature detection systems and methods in accordance with illustrative embodiments of the present invention is to produce a sequence of poses, each pose corresponding to an image. By dividing the change in pose coordinates between two images by the time difference between the times at which the images were captured, estimates of the velocity of motion of objects or material are made. Velocity can have up to the same number of degrees of freedom as pose—translation degrees of freedom give rise to linear velocity estimates, for example, and orientation degrees of freedom give rise to angular velocity estimates. In an illustrative embodiment, differences in pose and time are computed between successive images and then their ratios are filtered by a low-pass filter.

The velocity estimates can be used for a variety of purposes. In an illustrative embodiment, the filtered velocity estimates are used to predict the pose of the field of view relative to the object or material as part of the analysis that determines the map. The predicted pose is used by the analysis to make it run faster, which is desirable so as to keep the time resolution of the system as fine as is practical.

Dynamic edge detection systems and methods produce a wealth of information, including, for example, the attributes of dynamic features, sequence of poses, and a sequence of velocity estimates. This information can be used for a wide variety of purposes that will occur to one of ordinary skill.

In illustrative embodiments of particular practical value, the sequence of pose and/or velocity estimates obtained from unknown objects or materials are provided to external equipment by means of suitable signals. Signals may include, for example, the well-known quadrature signals, analog current loop, and/or any serial or parallel communications protocol. These illustrative embodiments can be used to advantage in, for example, industrial manufacturing applications as an alternative to conventional mechanical shaft encoders, for discrete objects, continuous webs of material, or any other object or material where dynamic features can be detected. In such applications the conventional shaft encoders provide reliable measurement of the rotation of transport drive shafts, but not necessarily the position and/or velocity of the actual object or material being transported. The present invention provides a practical, inexpensive, non-contact, and/or reliable means for directly tracking the motion of the objects or material.

In another illustrative embodiment of particular practical value, dynamic feature detection using objects of substantially known appearance is used in an improved method and system for optoelectronic detection and location of objects. Methods and systems for such a purpose were disclosed in U.S. patent application Ser. No. 10/865,155, entitled METHOD AND APPARATUS FOR VISUAL DETECTION AND INSPECTION OF OBJECTS, and U.S. patent application Ser. No. 11/763,752, entitled METHOD AND SYSTEM FOR OPTOELECTRONIC DETECTION AND LOCATION OF OBJECTS, the contents of both of which are hereby incorporated herein by reference. In certain illustrative embodiments disclosed in these applications, various systems and methods were taught to locate objects of substantially known appearance. Systems and methods of the present invention, or portion thereof, can be used in combination or as an alternative to provide improved accuracy, reliability, and/or ease of training among other benefits.

The above-incorporated U.S. patent application Ser. No. 11/763,752, while not teaching or anticipating dynamic feature detection, does disclose an apparatus and process for one-dimensional image capture that can be used advantageously to practice certain 1D embodiments of the present invention.

BRIEF DESCRIPTION OF THE DRAWINGS

The invention will be understood from the following detailed description, along with the accompanying figures, wherein:

FIG. 10 shows portions of a memory storing values associated with the static and dynamic edges of FIG. 9, as well as selected map data.

DETAILED DESCRIPTION OF THE DRAWINGS

Figure 1:
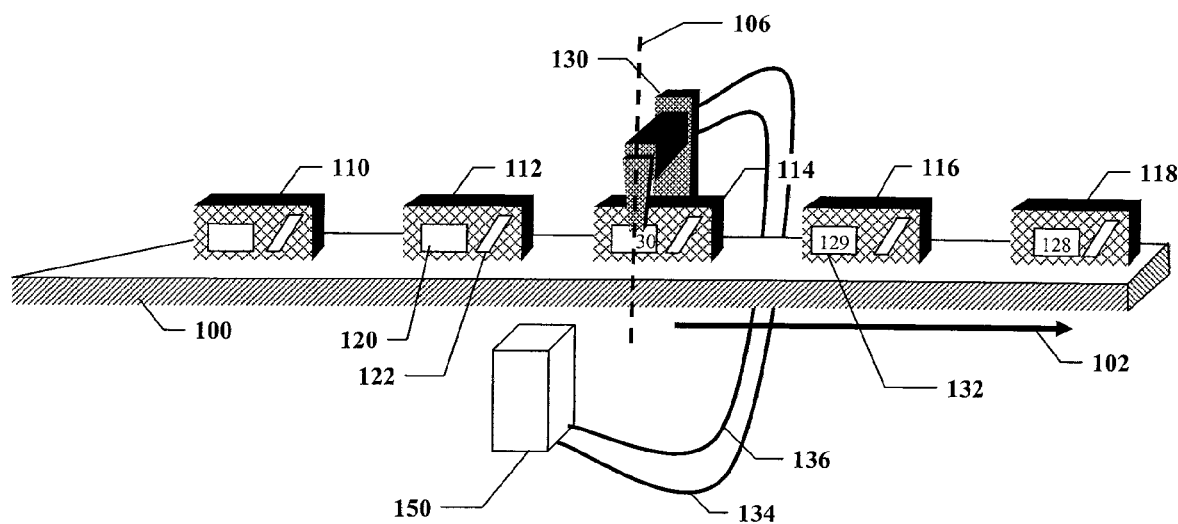
FIG. 1 shows an example application of a system according to the invention for detecting discrete objects of substantially known appearance, and/or tracking discrete objects of substantially unknown appearance.

In the following detailed description of the illustrative embodiments, reference is made to the accompanying drawings which form a part hereof, and in which are shown by way of illustration specific embodiments in which the invention may be practiced. It is to be understood that other embodiments may be utilized and structural changes may be made without departing from the scope of the invention.

Some Definitions

As used herein a sensor is any device that can produce a digital image, including but not limited to optoelectronic devices, x-ray machines, scanning electron microscopes, ultrasonic devices, radar, and sonar.

As used herein the terms object and material are generally interchangeable and refer to any physical substance that can interact with a sensor so as to produce a digital image. The interaction typically involves some form of radiation, such as light, x-rays, or microwaves, but can also include sound or any other means for producing an image. Objects and material may be, for example, discrete items or continuous webs. In the descriptions and claims of this patent, one term or the other may be chosen for linguistic style, or one or both may be used for no particular reason, and these choices should not be interpreted as limiting the description or claim to certain kinds of physical substances unless a more specific substance is explicitly called out.

An object feature is a physical feature on an object that, by interaction with a sensor, gives rise to a pattern in a digital image. Object features have physical properties such as position and size. An image feature is such a pattern, which can be analyzed to provide information about the object feature and the object that contains it.

A static feature comprises information extracted from an image feature by an image analysis method or system. A static edge is a type of static feature that may, for example, arise from a discontinuity of depth, orientation, or reflectance on the surface of an object. A static blob is a type of static feature that may, for example, arise from a connected region of uniform depth, orientation, or reflectance. Static edge and blob detection methods are well-known in the art. Static features can also be obtained using any of a wide variety of well-known methods, including for example matched filters, Hough transforms, and geometric pattern matching.

A dynamic feature comprises information that describes and corresponds to an object feature, wherein the information is determined by analysis of a plurality of images captured during relative movement between the object or material and the field of view. The information comprises at least one measurement of a physical property of the object feature, for example its position. Individual elements of the information are called attributes or values. A dynamic edge is a type of dynamic feature that may, for example, correspond to a discontinuity of depth, orientation, or reflectance on the surface of an object. A dynamic blob is a type of dynamic feature that may, for example, correspond to a connected region of uniform depth, orientation, or reflectance. Dynamic features can also include, for example, holes, corners, lines, and patterns.

As used herein a process refers to systematic set of actions directed to some purpose, carried out by any suitable apparatus, including but not limited to a mechanism, device, component, module, software, or firmware, or any combination thereof that work together in one location or a variety of locations to carry out the intended actions, and whether or not explicitly called a process herein. A system according to the invention may include suitable processes, in addition to other elements.

The descriptions herein may be of embodiments of systems or methods according to the invention, wherein such systems comprise various processes and other elements, and such methods comprise various steps. It will be understood by one of ordinary skill in the art that descriptions of systems can easily be understood to describe methods according to the invention, and visa versa, where the processes and other elements that comprise the systems would correspond to steps in the methods.

Motion and Coordinate Systems

The invention uses motion of objects or material in and/or through the field of view to capture and process a plurality of images that correspond to a plurality of pixel grid alignments. Estimates of the position, weight, and other attributes of a feature are based on an analysis of the appearance of the feature as it moves relative to the field of view and appears at a plurality of pixel grid alignments. The resulting reliability and accuracy is superior to prior art static feature detection systems and methods.

According to an illustrative embodiment of the present invention, physical motion is described by one or more parameters corresponding to one or more degrees of freedom in which the motion may occur. For example, motion of rigid bodies in a 2D image might be described by three parameters, two of translation and one of rotation. Similarly, motion of a rigid body in a 1D image would be described by one translation parameter. Motion closer to and/or farther away from certain kinds of sensors can be described by a size degree of freedom, since the object would appear larger or smaller as it moved closer or farther. For a 1D sensor of this kind, for example, motion could be described by two parameters, one of translation and one of size. While motion is generally expected to be principally confined to the degrees of freedom of a particular embodiment, motion in other degrees of freedom can often be tolerated without significant effect.

In general many other well-known degrees of freedom can be used as appropriate to the motion in a given application, including, for example, those of the affine and perspective transformations. Furthermore, the objects need not be rigid bodies as long as the parameters of motion can be defined. The set of parameters used to define the degrees of freedom in a particular embodiment are referred to collectively as the pose of the object or material relative to the field of view, or conversely the pose of the field of view relative to the object or material. The pose provides, for each image, a mapping between points on the object and points in the image.

While some motion is a necessary element of dynamic feature detection, the motion need not be continuous or smooth. Motion may change in magnitude and/or direction arbitrarily and without any prior knowledge or warning. Furthermore, objects may come to rest in the field of view for indefinite periods of time. In all cases, motion is understood to be relative motion between a sensor and an object. Illustrative embodiments of the present invention may be described herein using a stationary sensor and a moving object. It should be noted that in alternative embodiments, the sensor may be in motion while the object is stationary and/or both the object and the sensor may be in motion. As such, the description of a stationary sensor and a moving object should be taken as exemplary only.

Dynamic features are associated with a moving object or material, not with the field of view, and so their position and orientation attributes are advantageously represented in a coordinate system attached to the object or material. This coordinate system, which may be one- or two-dimensional depending on the dimensionality of the images in use, is referred to herein as object coordinates. The range of object coordinates may be unbounded in any or all directions. For example, in an illustrative 1D embodiment for use with a continuous web of material, object coordinates would comprise position along the web, and would have an unbounded range of at least the length of the web. In embodiments using 1D images, the object coordinate may be referred to herein as global position.

Static features detected by the systems and methods of the invention are associated with the field of view, and are advantageously represented in image coordinates. Given the unbounded range of object coordinates, it is convenient to use the pose of the field of view relative to the object to provide a mapping between object and image coordinates. Note that this mapping may be different for each captured image, as the object or material moves in the various degrees of freedom of the pose.

Exemplary Applications

FIG. 1 illustrates an example application of an illustrative embodiment of the invention to detect and/or track objects. Conveyer 100 moves boxes 110, 112, 114, 116, and 118 in direction of motion 102. Each box in this example includes a label, such as example label 120, and a decorative marking, such as example marking 122. A printer 130 prints characters, such as example characters 132, on each label as it passes by. In the example of FIG. 1, the boxes are the objects to be detected and tracked.

The illustrated embodiment comprises an apparatus 150 that outputs detection signal 134 to printer 130 at times when labels to be printed pass, or are in some desirable position relative to, reference point 106. In an illustrative embodiment detection signal 134 comprises a pulse indicating that a label has been detected, and wherein the leading edge of the pulse occurs at the time that a label is at reference point 106 and thereby serves to indicate that printing should begin. Detection signal 134 is provided according to the invention using predetermined dynamic features that correspond to the known appearance of the boxes, as further described herein. Detection signal 134 may advantageously be synchronized with the location of the labels using systems and methods disclosed in the above-incorporated U.S. patent applications Ser. Nos. 10/865,155 and 11/763,752.

Apparatus 150 further outputs motion signal 136 to printer 130 to provide information about the motion of the boxes (position and/or velocity) for control of the printing process. In an illustrative embodiment motion signal 136 comprises the well-known quadrature encoding. Motion signal 136 may be provided according to the invention using dynamic features that correspond to unknown object features of the boxes, as further described herein. Such unknown object features may include edges of the labels or decorative markings, texture on the surface of the boxes, or any other visually resolvable features.

The illustrative embodiment of FIG. 1 outputs both detection signal 134 and motion signal 136 to printer 130. Many other arrangements may be used with alternative embodiments of the invention, including outputting just one of the signals, using two separate devices looking at two distinct portions or surfaces of the boxes to output the two signals, and outputting one or both signals to an intermediary device such as a programmable controller.

Figure 2:
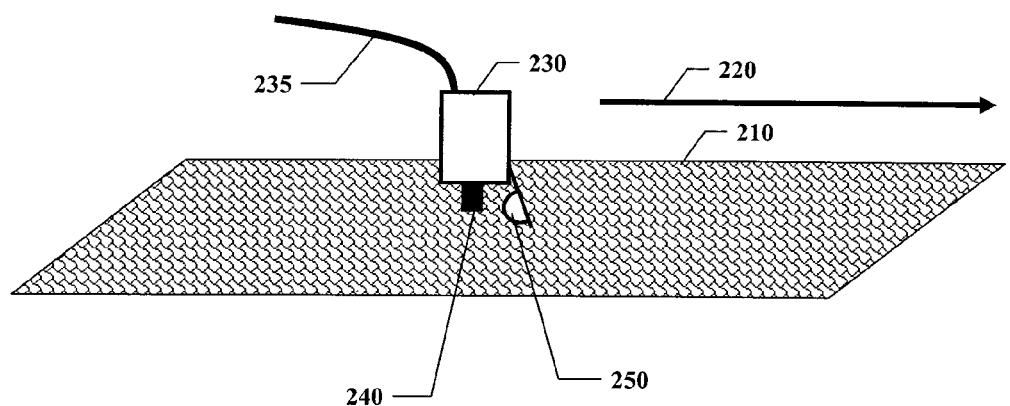
FIG. 2 shows an example application of a system according to the invention for tracking the motion of a web of continuous material.

FIG. 2 illustrates an example application of an illustrative embodiment of the invention to track a continuous web of material. Web 210 moves in direction of motion 220 relative to apparatus 230. Web 210 contains object features in the form of surface microstructure that gives rise to image features when illuminated by grazing illumination 250. Images are formed using telecentric lens 240 so that the optical magnification is constant in the presence of fluctuations in distance between web 210 and apparatus 230. Use of grazing illumination and telecentric optics are well-known in the art.

Apparatus 230 operates in accordance with the invention to output motion signal 235, which in an illustrative embodiment is a quadrature signal. With the arrangement of FIG. 2, motion signal 235 provides information about the true motion of web 210, in contrast to the indirect and, at times, inaccurate information that might be provided by a conventional mechanical encoder attached to a drive shaft of the transport mechanism.

Illustrative Apparatus

Figure 3:
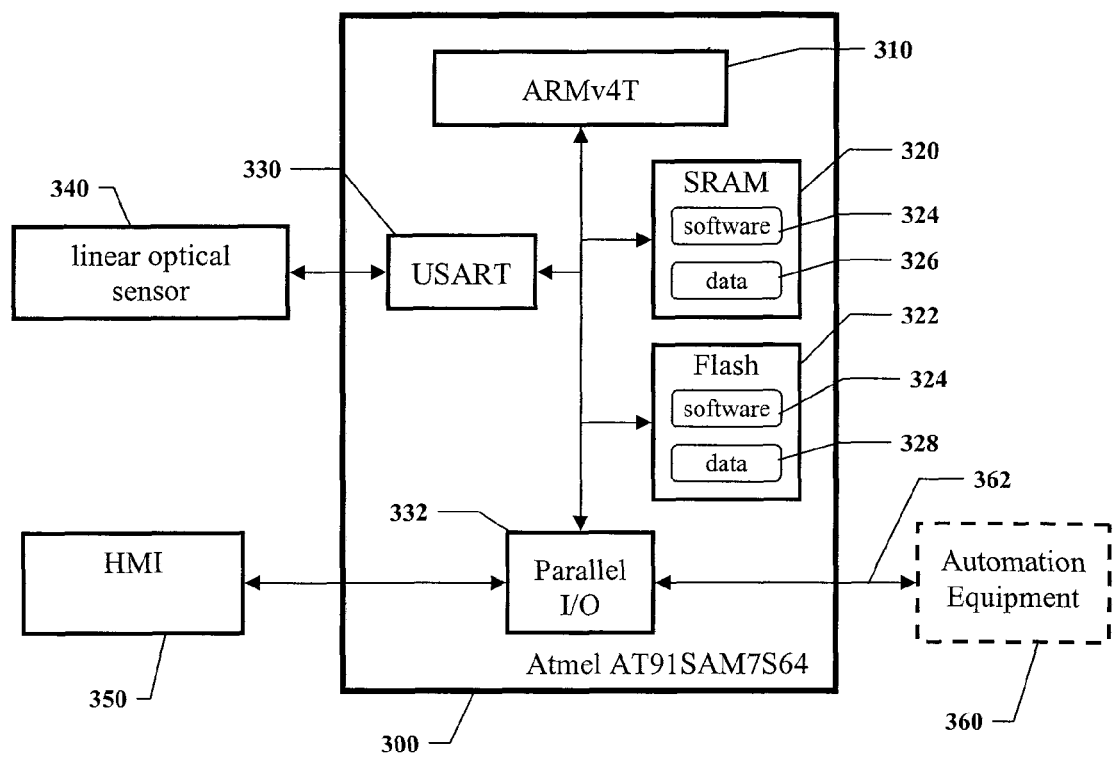
FIG. 3 shows a block diagram of an illustrative apparatus.

FIG. 3 is a block diagram of an illustrative embodiment of a portion of an apparatus according to the invention. Microcontroller 300, such as the AT91SAM7S64 sold by Atmel Corporation of San Jose, Calif., comprises ARMv4T processor 310, read/write SRAM memory 320, read-only flash memory 322, universal synchronous/asynchronous receiver transmitter (USART) 330, and parallel I/O interface (PIO) 332. Illustratively, the processor 310 controls the other elements of microcontroller 300 and executes software instructions 324 stored in either SRAM 320 or flash 322 for a variety of purposes. SRAM 320 holds working data 326, and flash 322 holds non-volatile data 328 used by processor 310. Microcontroller 300 operates at a clock frequency of 55 MHz. As will be appreciated by one skilled in the art, other processors, storage media, peripherals, interfaces, and configurations of these elements may be used in alternative embodiments of the present invention. As such, the description of microcontroller 300 and its elements should be taken as exemplary only.

Linear optical sensor 340, such as the TSL3301-LF sold by Texas Advanced Optoelectronic Solutions (TAOS) of Plano, Tex., comprises a linear array of 102 photoreceptors. Linear optical sensor 340, under control of processor 310 by commands issued using USART 330, can expose the linear array of photoreceptors to light for an adjustable period of time called the exposure interval, and can digitize the resulting 102 light measurements and transmit them in digital form to USART 330 for storage in SRAM 320. Linear optical sensor 340, also under control of processor 310, can apply an adjustable analog gain and offset to the light measurements of each of three zones before being digitized, as described in TAOS document TAOS0078, January 2006, the contents of which are hereby incorporated by reference.

In an illustrative embodiment, linear optical sensor 340 is calibrated to compensate for any non-uniformity of illumination, optics, and response of the individual photoreceptors. A uniformly white object is placed in the field of view, or moved continuously in the field of view, and the gain for each of the three zones is set so that the brightest pixels are just below saturation. Then a calibration value is computed for each pixel, such that when each gray level is multiplied by the corresponding calibration value, a uniform image is produced for the uniformly white object. The calibration values are stored in flash 322 and applied to subsequent captured images. The calibration values are limited such that each gray level is multiplied by no more than 8. Each image used by the calibration procedure is obtained by averaging 512 captured images.

Any suitable means can be employed to illuminate the field of view of linear optical sensor 340. In an illustrative embodiment, two 630 nm LEDs are aimed at the field of view from one side of linear optical sensor 340, and two 516 nm LEDs are aimed at the field of view from the other side. A light-shaping diffuser, such as those manufactured by Luminit of Torrance, Calif., is placed in front of the LEDs so that their beams are spread out parallel to linear optical sensor 340. In another illustrative embodiment, LEDs are placed to form grazing illumination suitable for imaging surface microstructure.

Human users, such as manufacturing technicians, can control the system by means of human-machine interface (HMI) 350. In an illustrative embodiment, HMI 350 comprises an arrangement of buttons and indicator lights. Processor 310 controls HMI 350 using PIO interface 332. In other embodiments, an HMI consists of a personal computer or like device; in still other embodiments, no HMI is used.

The apparatus of FIG. 3 produces signal 362 for purposes including indicating detection and motion of objects. Signal 362 is connected to automation equipment 360 as required by a given application. Signal 362 can be generated by PIO interface 332, under control of processor 310, or by other peripheral devices contained in or external to microcontroller 300. Note that automation equipment 360 is shown for illustrative purposes only; signal 362 may be used for any purpose and need not be connected to any form of automation equipment, and signal 362 need not be used at all.

In an illustrative embodiment, various processes are carried out by an interacting collection of digital hardware elements, including for example those shown in the block diagram of FIG. 3, suitable software instructions 324 residing in SRAM 320 or flash 322, working data 326 residing in SRAM 320, and non-volatile data 326 residing in flash 322.

The illustrative embodiment of FIG. 3 is suitable for one-dimensional images. By replacing linear optical sensor 340 with a two-dimensional sensor, an apparatus suitable for two-dimensional images is obtained. For such an apparatus it may be advantageous to also replace microcontroller 300 with a more powerful processor. For example, the apparatus taught in previously incorporated U.S. patent application Ser. No. 10/865,155 may be used.

Processes Employed by Various Embodiments of a System According to the Invention As used herein a capture process obtains images of the field of view of a sensor. The images may be in any form that conveys information about objects and material in the field of view and is suitable for analysis by other processes as required. The images may reside in the sensor, in memory external to the sensor, or any combination; and may be obtained by any suitable form of analog and/or digital signal processing, including but not limited to gain and offset, resampling, change in resolution, time filtering, and/or spatial filtering.

In the illustrative apparatus of FIG. 3, the capture process comprises digitizing light measurements so as to obtain an array of numbers, called pixels, whose values, called gray levels, correspond to the light measurements; transferring the pixels from linear optical sensor 340 to microcontroller 300; and storing the pixels into SRAM 320 for subsequent analysis. Following the usual convention in the art, a pixel may refer either to an element of the array of numbers, or to a unit of distance corresponding to the distance between two adjacent elements of the array. The array of pixels in this illustrative apparatus is a one-dimensional digital image.

As used herein a motion process provides relative motion between objects and the field of view of a sensor. The objects, the sensor, and/or the field of view can be moving, as long as there is relative motion. Example motion processes include, but are not limited to: a conveyer moving objects past a fixed or moving sensor; a sensor attached to a robot arm that moves the sensor past fixed or moving objects; a fixed object and a fixed sensor that uses some means, for example a moving mirror, to move the field of view; and objects in freefall that pass a fixed or moving sensor.

As used herein a static feature detection process analyzes an image to produce a set of static features. Such a set may contain any number of static features, including none, depending on the content of the image. In the illustrative embodiment of FIG. 3, a static feature detection process comprises a digital computation carried out by processor 310, operating on working data 326 stored in SRAM 320 or in the registers of processor 310, under the control of software instructions 324 stored in either SRAM 320 or flash 322.

As used herein an analysis process comprises a computation that operates on certain input information to produce certain result information, for example the analysis process that determines a map. In the illustrative embodiment of FIG. 3, an analysis process comprises a digital computation carried out by processor 310, operating on working data 326 stored in SRAM 320 or in the registers of processor 310, under the control of software instructions 324 stored in either SRAM 320 or flash 322.

Alternative embodiments of the invention may optionally include a signaling process whose purpose is to produce a signal that communicates information obtained in the course of their operation, for example information about object motion, identity, and/or quality. A signal can take any form known in the art, including but not limited to an electrical pulse, an analog voltage or current, data transmitted on a serial, USB, or Ethernet line, radio or light transmission, and messages sent or function calls to software routines. The signal may be produced autonomously or in response to a request from other equipment.

In the illustrative embodiment of FIG. 3, a signaling process comprises a digital computation carried out by processor 310, operating on working data 326 stored in SRAM 320 or in the registers of processor 310, producing signal 362 under the control of software instructions 324 stored in either SRAM 320 or flash 322. Signal 362 may comprise an electrical pulse, a quadrature encoding using two wires, or any suitable arrangement.

As will be appreciated by one skilled in the art, any combination of processes that interact in any way is also a process. Thus the description of various embodiments as comprising various specific processes is made for convenience and ease of comprehension only. It is expressly contemplated that in alternative embodiments similar functions may be performed by additional or fewer processes. As will further be appreciated by one skilled in the art, processes may be taught herein without explicitly being called processes. As such, the description herein of a specific set of processes should be taken as exemplary only.

An Illustrative Method

Figure 4:
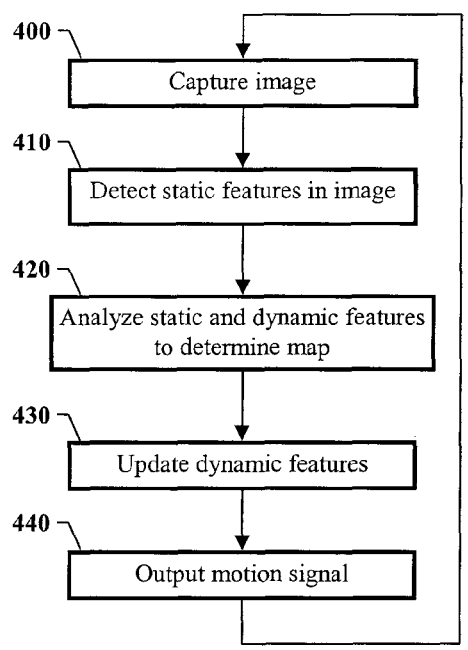
FIG. 4 shows a flowchart describing an illustrative embodiment of a method according to the invention.

FIG. 4 shows a flowchart describing an illustrative embodiment of a method according to the invention. The flowchart shows a continuous loop of steps that are carried out at some suitable rate. For the illustrative apparatus described below in relation to FIG. 3, for example, the rate is around 8000 images per second. However, as will be appreciated by one skilled in the art, varying rates may be utilized in alternative embodiments. As such, the description of 8000 images per second should be taken as exemplary only.

Capture step 400 captures an image of the field of view. Since the steps of FIG. 4 form a continuous loop, the effect of capture step 400 is to capture a sequence of images of the field of view.

Static detection step 410 detects a set of static features in the captured image, as further described herein. The set may have any number of static features, including none, depending on the image.

Analysis step 420 analyzes the set of static features and a stored plurality of dynamic features (described in detail herein) to determine a map between the static and dynamic features. The map generally has two components: a pose that maps between points on the object and points in the image, and an association that maps dynamic features to corresponding static features. Typically a dynamic feature corresponds to one static feature, but there may be ambiguous cases where a dynamic feature corresponds to more than one static feature, as well as cases where a dynamic feature corresponds to no static feature. In addition to producing a map, analysis step 420 may produce a match score that indicates a degree of confidence that that map is valid, i.e. that the object or material continues to be correctly tracked as it moves.

In an illustrative embodiment using one dimensional images and edges, a static edge corresponds to a dynamic edge if the position of the static edge, after being mapped to object coordinates using the pose, is sufficiently close to the position of the dynamic edge, and further if the polarity of the edges match. In an illustrative 2D embodiment, the requirement that the polarities match is replaced by a requirement that the orientations, after suitable mapping to object coordinates, are sufficiently close. Other rules of correspondence can be used in alternative embodiments of the invention, including rules that ignore polarity or orientation altogether, and rules that use other attributes of the features. In certain illustrative embodiments, static features that correspond to no dynamic features are ignored; in other illustrative embodiments, information from such static features may be used for a variety of purposes.

Update step 430 uses the map to updates dynamic features so as to improve their measurements of physical properties of corresponding object features, for example improving accuracy and/or reliability, as described in more detail herein.

The illustrative embodiment of FIG. 4 produces information in the form of the dynamic features themselves, as well as the sequence of maps that result from analysis step 420. This information can be used to output a wide variety of signals as may be appropriate for a given application. Output step 440, for example, outputs a motion signal that can be used to indicate the position, velocity, or other measurement of the motion of the object.

Illustrative Static Feature Detection

Figure 5:
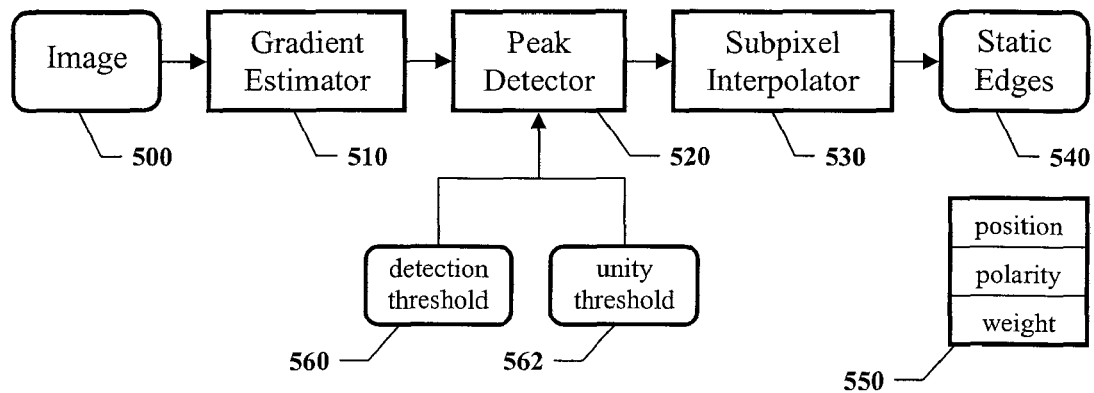
FIG. 5 shows a static feature detection process for an illustrative embodiment wherein the features to be detected are edges.

FIG. 5 shows a static feature detection process in an illustrative embodiment using static edges. Image 500 is processed by gradient estimator 510, resulting in estimates of image gradient at various points in image 500. For a one-dimensional image, gradient is a signed scalar value; for a two-dimensional image, gradient is a vector.

Gradient estimates are processed by peak detector 520, which produces a set of preliminary static edges (not shown) corresponding to points in image 500 where the magnitude of the gradient is a local maximum and exceeds detection threshold 560. Peak detector 520 also converts gradient magnitude at such locations to a weight value using unity threshold 562, as further described below in relation to FIG. 7.

The preliminary static edges, if any, are further processed by subpixel interpolator 530 to produce the set of static edges 540. Subpixel interpolator 530 uses parabolic interpolation to provide subpixel edge precision. Example static edge 550, suitable for an illustrative embodiment using one-dimensional images, comprises values indicating position, polarity, and weight of the static edge. As previously noted, position is in image coordinates, and therefore relative to the field of view.

Figure 6:
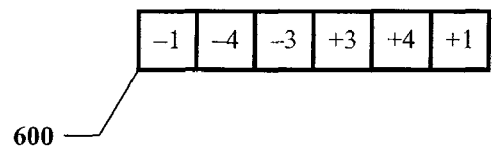
FIG. 6 shows a convolution kernel used in the static feature detection process of FIG. 5.

FIG. 6 shows a convolution kernel 600 used by gradient estimator 510 in the static feature detection process of FIG. 5 for an embodiment using one-dimensional images. Convolution kernel 600 is a composition of a first-difference operator and a 5-element approximately Gaussian smoothing kernel. Note that the output resulting from convolution with convolution kernel 600 can be divided by 8 for unity gain.

Figure 7:
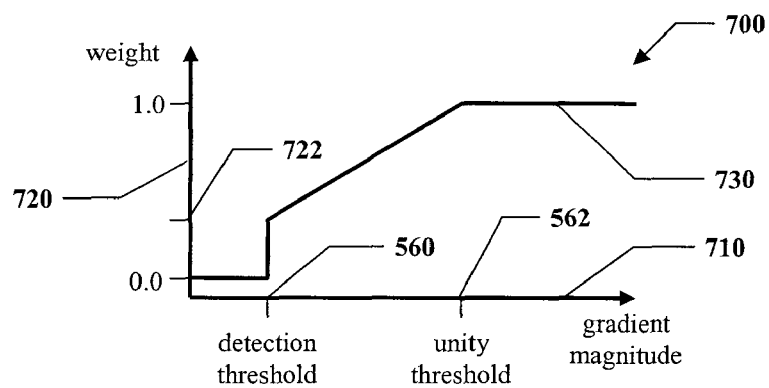
FIG. 7 shows a method for determining the weight of a static edge used in certain illustrative embodiments.

FIG. 7 shows a method for determining the weight of a static edge used in certain illustrative embodiments, including the embodiment of FIG. 5. The method of FIG. 7 is suitable for one- or two-dimensional images, and the principal behind it can be applied to any form of static feature detection.

Shown is a graph 700 of weight 720 as a function 730 of gradient magnitude 710. Weight 720 falls within the range 0.0-1.0 and indicates relative confidence that the static edge corresponds to an object feature and not, for example, some artifact of instrumentation. Peak detector 520 insures that no static edges are produced having gradient magnitude values below detection threshold 560, and so weights corresponding to such values are effectively zero, as shown. Gradient magnitudes at detection threshold 560 correspond to minimum weight 722, and those at unity threshold 562 and above correspond to weight 1.0.

In an illustrative embodiment following FIGS. 5, 6, and 7, and wherein image 500 uses 8-bit pixels and convolution kernel 600 is divided by 8 for unity gain, detection threshold 560 is 8, unity threshold 562 is 24, and minimum weight 722 is 0.33.

The use of weight is not a required element of the invention. Results identical to those of embodiments that do not use weight can generally be achieved by embodiments herein described by replacing function 730 with a step function, for example by setting unity threshold 562 equal to detection threshold 560 so that weight 720 is 0.0 below detection threshold 560 and 1.0 at or above it. The illustrative embodiment of FIG. 7, however, may result in a significant improvement in reliability over embodiments without weight, by turning detection threshold 560 from a hard threshold into a soft threshold. Instead of a static feature going from no influence to full influence as its weight crosses detection threshold 560, it goes from no influence to small and increasing influence as its weight rises to unity threshold 562.

As is well-known to one of ordinary skill in the art, the literature of digital image processing provides a wide variety of alternative methods for one- and two-dimensional static edge detection that can be used to practice the invention. As such, the description of static edge detection described above in reference to FIG. 5-7 should be taken as exemplary only.

Dynamic Feature Detection for Objects of Substantially Unknown Appearance

In some embodiments the objects or material in the field of view are of substantially unknown appearance, i.e. the object features are not known in advance. Dynamic features are created as motion brings new physical features or characteristics into the field of view, are updated responsive to a learning process over a plurality of images as the objects or material move, and may optionally be discarded once the motion carries them substantially beyond the field of view.

Figure 8:
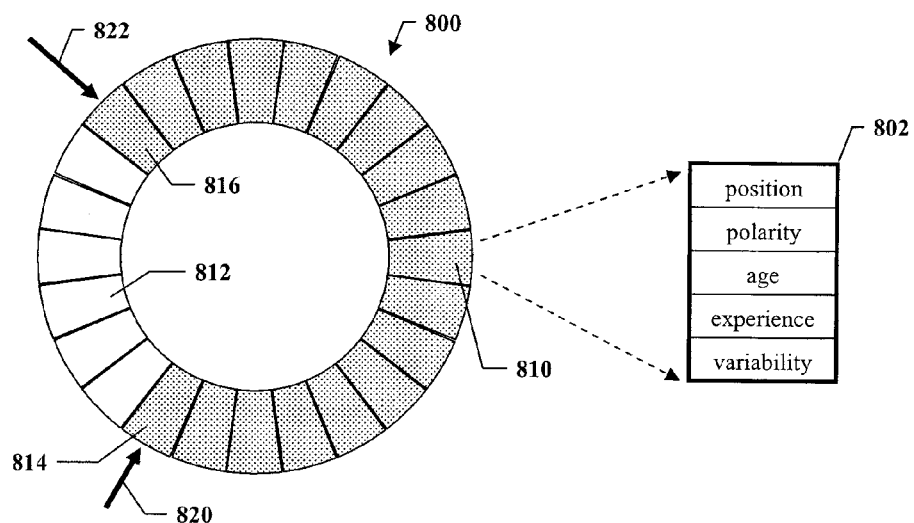
FIG. 8 shows a ring buffer used to store dynamic features in an illustrative embodiment wherein the objects are of substantially unknown appearance, and further shows one such dynamic feature.

FIG. 8 shows a memory used to store dynamic features in an illustrative embodiment using one-dimensional images and used for objects and material of substantially unknown appearance. The memory is organized as a ring buffer 800 comprising elements such as example element 810, each of which holds one dynamic feature, such as example dynamic feature 802. In FIG. 8 unshaded elements such as empty element 812 are not currently in use.

Dynamic features in ring buffer 800 are sorted in order of increasing global position. Lower pointer 820 indicates the stored dynamic feature with the lowest global position, which are located closest to one end of the field of view, and upper pointer 822 indicates the stored dynamic feature with the highest global position, which are located closest to the other end of the field of view. Since birth and death of dynamic edges typically occurs at the ends of the field of view, where motion carries new features in and old features out, birth and death processes can be handled efficiently, and proper sorting can be maintained with no extra operations. Furthermore, keeping dynamic edges sorted by position allows for very efficient pattern matching methods.

Figure 9:
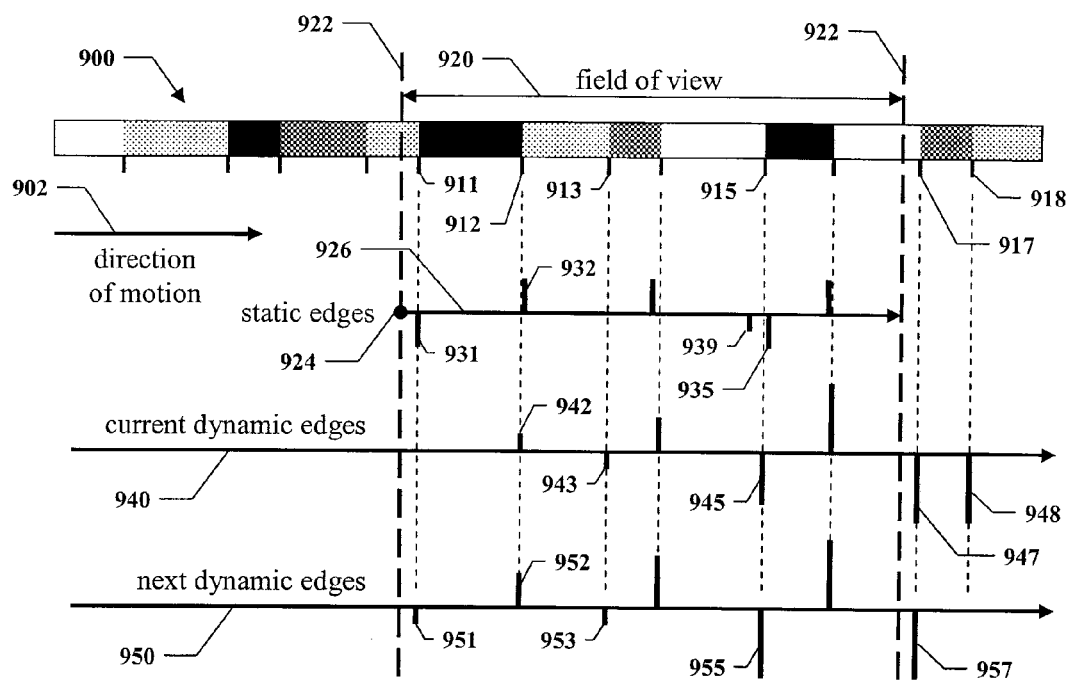
FIG. 9 shows a snapshot of the operation of an illustrative embodiment, and corresponding static and dynamic edges.

FIG. 9 shows a snapshot of the operation of an illustrative embodiment using one-dimensional images and static and dynamic edges. Material 900 moves in direction of motion 902 relative to field of view 920 marked by boundaries 922. Associated with field of view 920 are image coordinate axis 926 and image origin 924. Material 900 contains object features marked as shown, including first object feature 911, second object feature 912, third object feature 913, fifth object feature 915, seventh object feature 917, and eighth object feature 918.

A static edge detection process produces a set of static edges for a captured image corresponding to the indicated relative position of material 900 and field of view 920. Static edges are shown along image coordinate axis 926, including first static edge 931, second static edge 932, fifth static edge 935, and ninth static edge 939. In the figure static edges are shown with length indicating weight and direction indicating polarity. First static edge 931 arises from first object feature 911, and likewise for the others.

Note that third object feature 913 gives rise to no static edge in this image, and of course neither do seventh object feature 917 and eighth object feature 918 because those two are outside of of field of view 920. Furthermore, ninth static edge 939 is an artifact and arises from no physical object feature.

Dynamic edges in existence prior to any analysis of the current image are shown along current object coordinate axis 940, and those in existence after analysis of the current image are shown along next object coordinate axis 950. In the figure dynamic edges are shown with length indicating experience and direction indicating polarity.

Next first dynamic edge 951 has just been born from first static edge 931; it did not exist prior to analysis of the current image, and was carried into field of view 920 by motion of material 900.

Current second dynamic edge 942 corresponds to second static edge 932, and is updated to produce next second dynamic edge 952, which has more experience and a more accurate position.

Current third dynamic edge 943 corresponds to no static edge, and is updated to produce next third dynamic edge 953 by incrementing the age, but which gains no more experience.

Current fifth dynamic edge 945 corresponds ambiguously to fifth static edge 935 and ninth static edge 939. In the illustrated embodiment, the ambiguity is resolved in favor of fifth static edge 935 because it is closer to current fifth dynamic edge 945. If two ambiguous static edges happened to be equally close, the one with the larger weight would be chosen. If the weights were also equal, their positions would be averaged (the average position is of course the position of the dynamic edge, since they are equally close and cannot be at the same position). Note that while many other rules can be devised to handle ambiguous correspondence, it is desirable to avoid rules that choose the one with the lowest (or highest) coordinate, because such a rule would introduce a direction bias into measurements of pose that would accumulate over long travel distances. Current fifth dynamic edge 945 is updated to produce next fifth dynamic edge 955. Age and experience increase, but position won't change significantly because current fifth dynamic edge 945 is already quite experienced.

Current seventh dynamic edge 947 is now outside field of view 920. It is updated to produce next seventh dynamic edge 947 by incrementing the age but not otherwise changing. It continues to live for now because it is still close to field of view 920.

Current eighth dynamic edge 948 is now sufficiently outside field of view 920 that it dies.

FIG. 10 shows a first memory 1000 storing values associated with the static and dynamic edges of FIG. 9, as well as selected map data. FIG. 10 also shows second memory 1050 storing further map data as well as certain values computed by an illustrative analysis that determines the map.

Static edge column 1010 is a portion of first memory 1000 containing polarity, weight, and position values corresponding to the static edges of FIG. 9. Current dynamic edge column 1012 is a portion of first memory 1000 containing polarity, position, age, and experience values corresponding to the current dynamic edges of FIG. 9. Next dynamic edge column 1016 is a portion of first memory 1000 containing position, age, and experience values corresponding to the next dynamic edges of FIG. 9 (polarity values are the same as for current dynamic edge column 1012). Map data column 1014 is a portion of first memory 1000 containing selected map data, specifically weight, force, and offset.

In the illustrative embodiment of FIGS. 9 and 10, pose has one degree of freedom, represented by the global position (i.e. object coordinate) of image origin 924. Part of the analysis that determines the map in the illustrated embodiment computes, as further described below, coarse position 1052, which is an approximate pose. Coarse position 1052 is used by a fine alignment process to determine the map, i.e. the pose (global position of image origin 924) and association (static edges to which the current dynamic edges correspond), as will now be described.

As shown in second row 1022, static edge column 1010, second static edge 932 has positive polarity, weight 0.90, and position 14.20 pixels in image coordinates. Using coarse position 1052 second static edge 932 maps to global position 14.20+3715.00=3729.20. As further shown in second row 1022, current dynamic edge column 1012, second static edge 932 is determined to correspond to current second dynamic edge 942 because the polarities match and because they are sufficiently close (within 1.0 pixels in this illustrative embodiment)—current second dynamic edge 942 at global position 3728.70 is only −0.50 pixels distant.

Referring now to second row 1022, map data column 1014, the correspondence between second static edge 932 and current second dynamic edge 942 is given a weight of 2.60 because that is experience of current second dynamic edge 942. It is further given a force of −0.50, which means that the evidence provided by this correspondence suggests that field of view 920 should be "pulled" by −0.50 pixels from coarse position 1052 to come into better alignment with material 900. Of course as previously noted static edges are of limited accuracy and reliability, so this is just evidence and is not decisive.

These concepts of force and evidence used in this illustrative embodiment are a one-dimensional, one degree of freedom specialization of those concepts as presented in, for example, U.S. Pat. No. 6,658,145, entitled FAST HIGH-ACCURACY MULTI-DIMENSIONAL PATTERN INSPECTION, the contents of which are hereby incorporated by reference. The teachings therein can be used in embodiments of the present invention that use two-dimensional images and multiple degrees of freedom.

Fourth row 1024 and sixth row 1026 are similar to second row 1022.

Third row 1023 shows that current third dynamic edge 943 corresponds to no static edge, and so gets a correspondence weight of 0.00 and is given no force. Similarly, seventh row 1027 and eighth row 1028 show that current seventh dynamic edge 947 and current eighth dynamic edge 948 also correspond to no static edges, in this case because they are beyond field of view 920.

Fifth row 1025 and ninth row 1029 show that two static edges correspond to current fifth dynamic edge 945, fifth static edge 935 and ninth static edge 939. Both static edges match the polarity of current fifth dynamic edge 945, and both are sufficiently close (−0.60 and +0.90 pixels). As noted above, the ambiguity is resolved in favor of fifth static edge 935 because it is closer, and this correspondence is given weight 9.00 and force −0.60.

Common offset 1054 is −0.32, which is the weighted average of the forces weighted by the map weights of map data column 1014, which as described above are the experiences of dynamic edges that have corresponding static edges. This means that, considering all the evidence and trusting more experienced dynamic edges to a greater extent, field of view 920 should be pulled by −0.32 pixels from coarse position 1052 to come into substantially best alignment with material 900. Thus the analysis that determines the map produces global position 1056 (i.e. pose in this illustrative embodiment) of 3714.68. It has also, in the course of the analysis, produced an association mapping dynamic edges to corresponding static edges.

In an alternative embodiment using one dimensional images and a two degree of freedom pose comprising a position and a size degree of freedom, the fine alignment process computes a weighted linear regression between the image coordinate values of the static edges found in static edge column 1010 and the object coordinate values of the dynamic edges found in current dynamic edge column 1012, weighted by the correspondence weights (which come from dynamic edge experience) found in map data column 1014. The weighted linear regression for the example of FIG. 10 gives y=1.0004x+3714.67, where x is an image coordinate and y is an object coordinate. This provides not only a global position value (3714.67) but also a size value (1.0004) that indicates a 0.04% relative difference between the size of features in the field of view and the size of features in the image. The size degree of freedom can, depending on the nature of the sensor, be interpreted as motion of the object closer to or farther away from the sensor.

Match score 1058 is a measure of confidence that the analysis has determined a valid map, i.e. that material 900 continues to be tracked. It is computed in this illustrative embodiment by summing the correspondence weights in map data column 1014 and then dividing by the sum of the experiences of the current dynamic edges that are within field of view 920, which can be found in current dynamic edge column 1012. Essentially this is the weighted faction of dynamic edges still in the field of view that correspond to at least one static edge, again trusting more experienced dynamic edges to a greater extent. In this example match score 1058 is 0.89, which is considered to be sufficient to trust the map determined by the analysis.

As long as coarse position 1052 is reasonably close to the position of substantially best alignment, the fine alignment process will produce an accurate and reliable map that does not significantly depend on the exact value of coarse position 1052. If coarse position 1052 is too far away, fine alignment will fail. There is typically an intermediate range of coarse position where the fine alignment will move the pose closer to the position of substantially best alignment, but not get the best map. In such a case repeating the fine alignment one or more times, for example as described in the above-incorporated U.S. Pat. No. 6,658,145, can be advantageous (U.S. Pat. No. 6,658,145 describes these fine alignment steps as attract steps). In an illustrative embodiment, fine alignment is always run twice. In another illustrative embodiment, fine alignment is run a second time only if the first run produced a match score below some threshold, for example 0.85.

Next dynamic edge column 1016 shows how the map is used to update the dynamic edges in this illustrative embodiment. As shown in eighth row 1028, current eighth dynamic edge 948 dies and is deleted from memory 1000. As shown in third row 1023 and seventh row 1027, current third dynamic edge 943 and current seventh dynamic edge 947 gain one unit of age but gain no experience because they had no corresponding static edges. Their global position also doesn't change, which can be seen by inspecting current dynamic edge column 1014 and next dynamic edge column 1016.

As shown in second row 1022, fourth row 1024, fifth row 1025, and sixth row 1026, current second dynamic edge 942, current fourth dynamic edge 944, current fifth dynamic edge 945, and current sixth dynamic edge 946 gain one unit of age and also gain experience equal to the weight of the static edge to which they correspond (in the case of current fifth dynamic edge 945, after resolving the ambiguity).

The map is now used to improve the global positions of the dynamic edges that correspond to at least one static edge. This is in effect a learning process, wherein the less experienced dynamic edges learn their true global position from the more experienced ones. Referring to map data column 1014, each dynamic edge that corresponds to at least one static edge is given an offset value that is the difference between the global position of the static edge (i.e. its image coordinate mapped to object coordinate by the pose) and the dynamic edge. Note that this similar to the force, but based on global position 1056 instead of coarse position 1052 and of opposite sign.

Dynamic edge position is learned in this illustrative embodiment according to the formula:

$$\text{next position} = \text{current position} + \frac{\text{static weight} \times \text{offset}}{\text{next experience}}$$

Notably, since the updated experience (next experience in the formula) is the sum of all of the corresponding static weights over the life of the dynamic edge, the formula gives a weighted average position of all those static edges, after mapping to object coordinates using the poses.

One advantageous feature of this illustrative embodiment of the present invention is that learning diminishes as experience grows. Since the offsets are based on the pose, which is more influenced by more experienced dynamic edges, and learning generally decreases as experience increases, knowledge is passed from more experienced to less experienced dynamic features.

As shown in first row 1021, next first dynamic edge 951 is born from first static edge 931. Its age is 1, its position is determined by mapping the image position of first static edge 931 to object coordinates using the pose (i.e. global position 1056), and its experience is the static weight of first static edge 931.

As will be appreciated by one skilled in the art, many variations on the illustrative embodiment of FIGS. 9 and 10 can be envisioned without departing from the spirit of the invention. In one such variation, updating ends completely when a dynamic edge reaches a predetermined age, for example 64.

Figure 11:
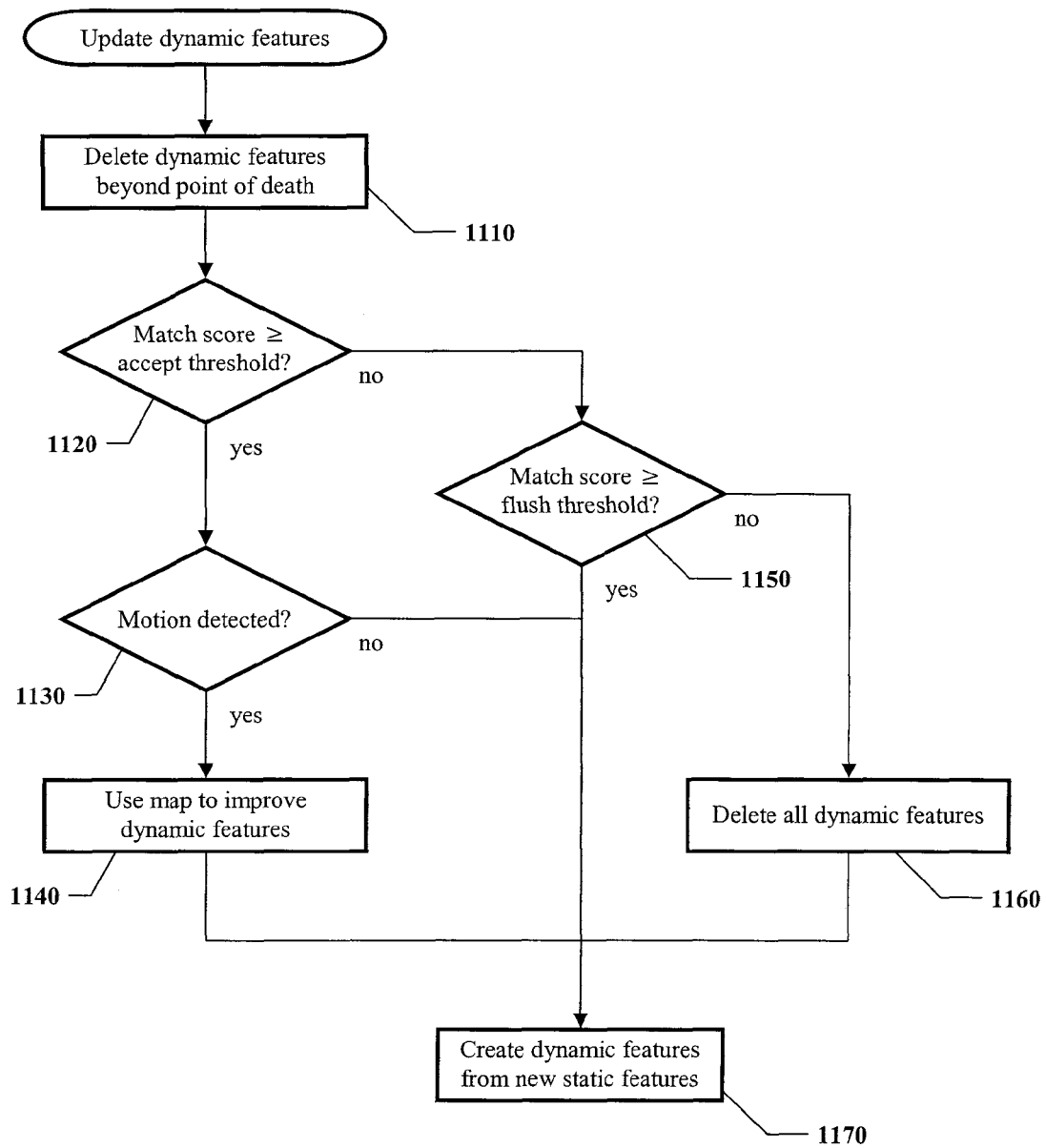
FIG. 11 shows a flowchart describing an illustrative embodiment of a method for updating dynamic features for objects of substantially unknown appearance.

FIG. 11 shows a flowchart describing an illustrative embodiment of a method for updating dynamic features for objects of substantially unknown appearance. In this embodiment FIG. 11 is a more detailed description of update step 430 of FIG. 4.

Death step 1110 deletes dynamic features beyond a certain "point of death" that is advantageously set somewhat beyond the ends of the field of view, for example 1 pixel beyond. If the direction of motion reverses, dynamic edges that are outside the field of view but that have not yet reached the point of death can come back into the field of view and bring with them all of their experience.

Accept test step 1120 examines the match score to decide if the map can be trusted. If it is at or above a certain accept threshold, for example 0.40, the map is trusted.

If the map is trusted, motion test step 1130 examines the pose to see if there has been any motion since the last capture image. The invention recognizes that it is generally desirable to avoid updating dynamic features that correspond to objects at rest, because the rest position represents an accidental alignment and the statistics of that alignment would soon swamp those obtained while the object is in motion. The invention further recognizes that in order to avoid the measurement noise of stationary objects being interpreted as motion, it is generally desirable to use some hysteresis, for example 1.5 pixels, in detecting the rest condition. If motion test step 1130 detects some motion, the map is used to update the dynamic features, for example as described above. If not, birth step 1170 is entered as described below.

If the map is not trusted, flush test step 1150 examines the match score to see if tracking has failed completely. If it is at or above a certain flush threshold, for example 0.20, tracking may recover on the next image, i.e. a trusted map may be produced. If flush test step 1150 judges that tracking has failed completely, restart step 1160 deletes all dynamic edges so a fresh start can be made.

Birth step 1170 creates new dynamic features from static features following any of a variety of suitable rules. In an illustrative embodiment, new dynamic edges are born from static edges that correspond to no living dynamic edges, are located at positions that are lower or higher than all living dynamic edges by some margin, for example 2.5 pixels, and have weights that exceed a certain birth weight, for example 0.90. Note that if all dynamic edges were deleted by restart step 1160 there will be no living dynamic edges when birth step 1170 runs, so a whole new set can be created.

It is clear that many variations on the illustrative embodiment of FIG. 11 can be envisioned without departing from the spirit of the invention. In one such variation, motion test step 1130 is moved to the beginning, so that birth or death only occur of there has been motion. This variation may be more efficient, because if there is no motion then nothing is moving into or out of the field of view and so there is no chance of birth or death. However, FIG. 11 illustrates that the primary advantage of using motion test step 1130 is to avoid contaminating the learning with an accidental alignment.

Figure 12:
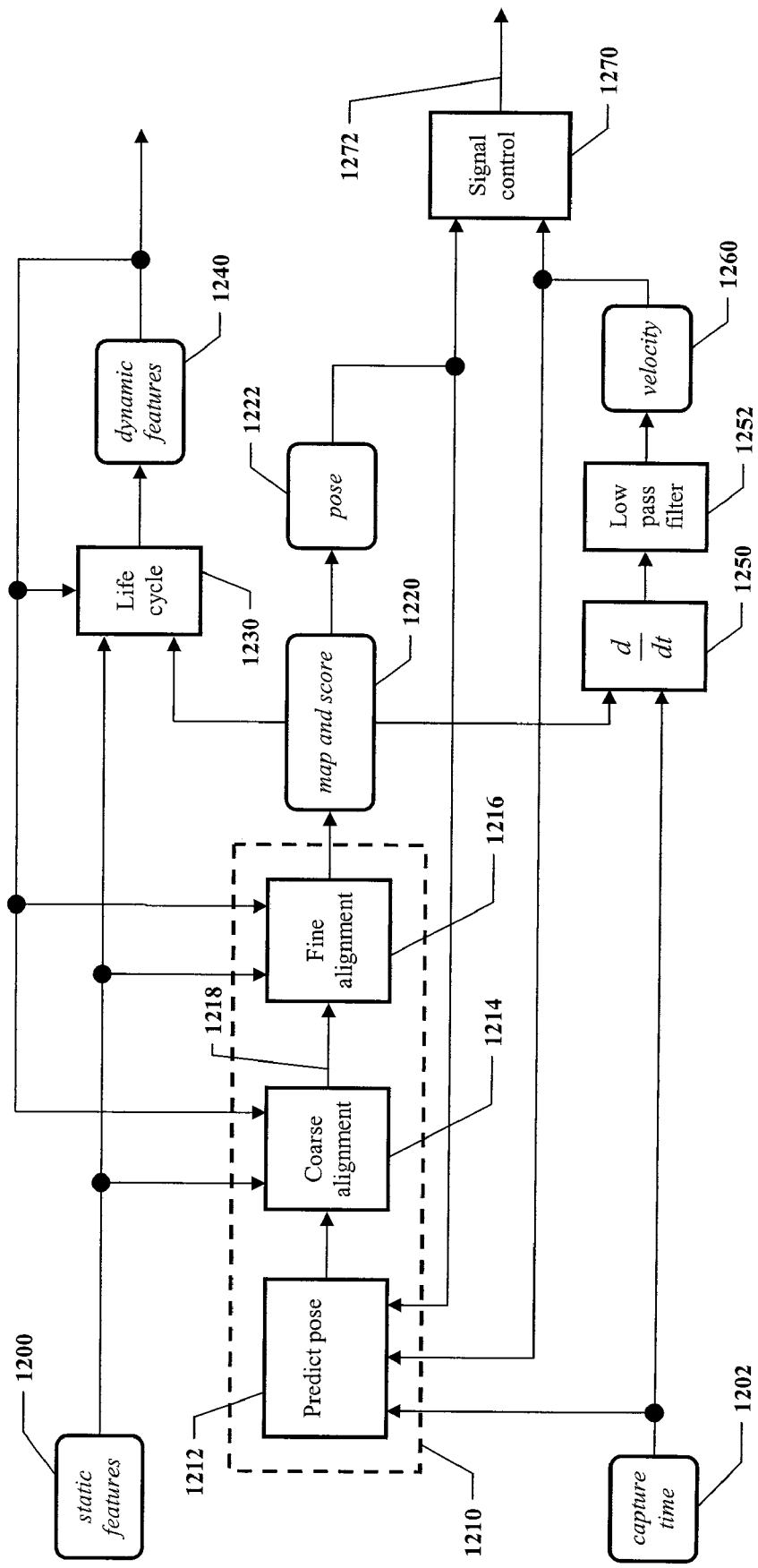
FIG. 12 shows a block diagram of an illustrative embodiment of a system according to the invention that can be used, among many purposes, for tracking moving objects and material.

Illustrative System for Distance and Speed Measurement of Material of Substantially Unknown Appearance FIG. 12 shows a block diagram of an illustrative embodiment of a system according to the invention that can be used, among many purposes, for tracking moving objects and material and producing distance and/or speed signals.

Static features 1200 are detected as previously described and used by other elements of FIG. 12 as shown and further described below. Dynamic features 1240 are stored in a memory, are born, live, and die in response to life cycle process 1230, and are used by other elements of FIG. 12, all as previously described and further described below. Life cycle process 1230 comprises a birth process, life process (also called a learning process herein), and a death process, all as illustratively described herein.

Capture time 1202 is produced by the image capture process and indicates a time at which each frame was captured, for example the center of the exposure interval. Time is used in this illustrative embodiment to compute velocity and also as part of analysis process 1210 that computes map and score 1220. It is important to understand, however, that time is not a required element of dynamic feature detection, and is used only in certain embodiments where, for example, a velocity measure is desired. The motion that is essential to dynamic edge detection refers to a sequence of positions of an object or material relative to a field of view, where neither the timing of that sequence nor the velocity of that motion are important.

Differentiator 1250 uses capture time 1202 and map and score 1220 to produce an instantaneous measurement of velocity for each captured image. If the score is sufficient to trust the map, the instantaneous velocity is determined by dividing the change in one or more degrees of freedom of the pose by the change in capture time, both changes being measured from some previous image, typically the most recent. If the score is not sufficient to trust the map (tracking temporarily lost), instantaneous velocity, in this illustrative embodiment, is zero. Note that the degrees of freedom of velocity are a subset (including possibly all) of the degrees of freedom of the pose. For example, if pose includes two degrees of freedom of position and one of orientation, velocity can include up to two linear and one angular components.

Instantaneous velocity is filtered by low pass filter 1252, for example a two-pole, critically damped, infinite impulse response digital low-pass filter, to produce velocity measurement 1260. The time constant of low pass filter 1252 can be set to filter out velocity variations (often just measurement noise) that are significantly faster than the mechanical time constants of the objects or material in use, resulting in very accurate measurements. Furthermore, in this illustrative embodiment, when tracking is lost velocity measurement 1260 is at first held at the last known value, and then decays to zero over time as controlled by the settable time constant. As will be seen in the following further description of FIG. 12, this insures that a brief loss of tracking has little significant effect on the system, but that in the presence of a prolonged loss velocity measurement 1260 approaches zero. Of course a tracking loss is not the same as the object coming to rest; in the latter case, tracking is maintained.

Analysis process 1210 uses static features 1200 and dynamic features 1240 to determine map and score 1220, which is used to update dynamic features 1240 in response to life cycle process 1230. Life cycle process 1230 can operate, for example, as described in relation to FIGS. 9, 10, and 11. Analysis process 1210 includes fine alignment process 1216 that can operate, for example, as described in relation to FIG. 10, using static features 1200, dynamic features 1240, and coarse pose 1218 to determine map and score 1220. Note that coarse position 1052 of FIG. 10 is an example of a coarse pose 1218 that might be used by fine alignment process 1216.

An illustrative process for determining coarse pose 1218 will now be described. It is desirable that such a process represent a good tradeoff among speed, accuracy, and reliability. One simple process for coarse alignment would be to run the fine alignment using a number of coarse poses spaced over some range, and choose the one with the highest match score. Such a process would generally be accurate and reliable, but might be too slow in many applications. The process of FIG. 12 is usually faster than such a simple process.

Prediction process 1212 uses capture time 1202, pose 1222 (which holds the pose computed from the last captured image), and velocity measurement 1260 to predict the pose of the current image assuming constant velocity. Accelerations with time constants shorter than the time constant of low pass filter 1252 lead to prediction errors, and while more sophisticated prediction processes can be devised, these are generally neither necessary nor sufficient. To be reliable one must at some point look at the actual image, and that is the role of coarse alignment process 1214. Prediction process 1212 is an inexpensive way to give coarse alignment process 1214 a hint, but in many embodiments it can be dispensed with entirely.

Many methods of coarse alignment are known. For example, methods taught in U.S. Pat. No. 7,016,539, entitled METHOD FOR FAST, ROBUST, MULTI-DIMENSIONAL PATTERN RECOGNITION, the contents of which are hereby incorporated by reference, are well-suited to two-dimensional images with many degrees of freedom of pose. In an illustrative embodiment using one-dimensional images, such as that described in relation to FIGS. 9 and 10, a 1D version of the well-known generalized Hough transform is used. Coarse alignment process 1214 considers a range of poses that is centered on the predicted pose and extends far enough to handle any expected prediction errors, for example±1.25 pixels, but not so far that speed of operation is unacceptably low. If for some reason coarse alignment is judged to fail (e.g. there is no clear and unambiguous position of best alignment), the predicted pose is used instead for coarse pose 1218.

If the score is not sufficient to trust the map (tracking temporarily lost), pose is generally undefined. In the illustrative embodiment of FIG. 12, pose 1222 is set from the map if it is trustworthy, otherwise it is set to the predicted position.

Thus if tracking is briefly lost, low pass filter 1252 insures that pose 1222 continues to update based on the last known velocity, ramping down to stationary after some time.

Signaling process 1270 uses pose 1222 and/or velocity measurement 1260 to output signals 1272 that can be used by other systems to track the position and/or velocity of the object or material. A quadrature signal can be used for position, for example.

Illustrative Embodiment Using 2D Images and Blob Features

Figure 13:
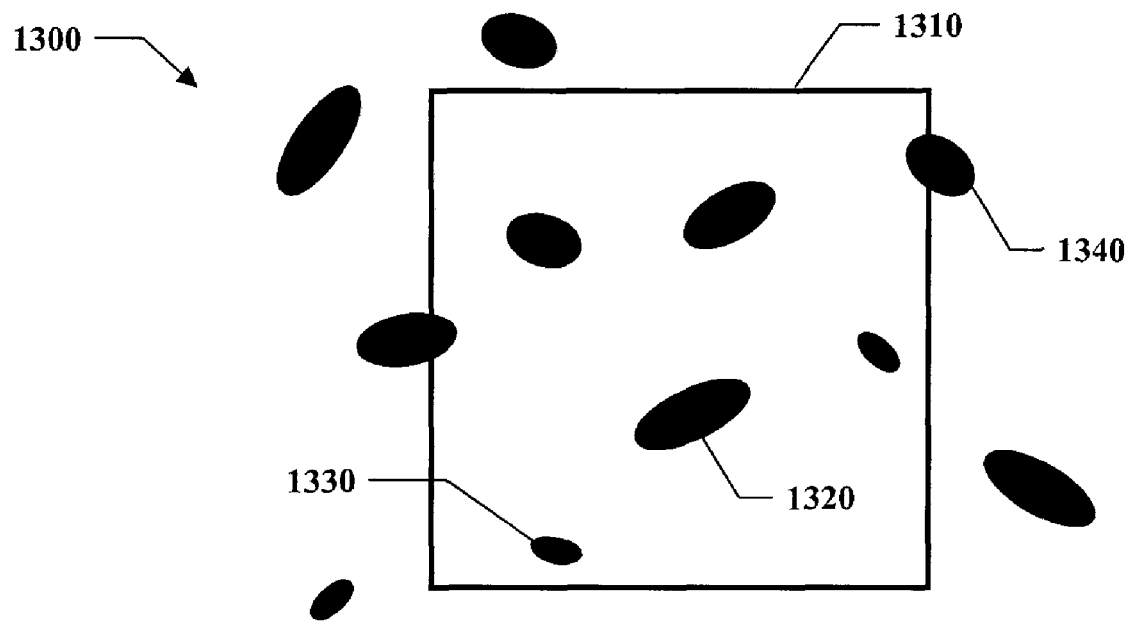
FIG. 13 shows a snapshot of the operation of an illustrative embodiment, including material of substantially unknown appearance, that uses two-dimensional images and wherein the features are blobs detected by connectivity analysis.

FIGS. 13-16 show an illustrative embodiment using 2D images and blob features. Referring to FIG. 13, material 1300 of substantially unknown appearance moves relative to 2D field of view 1310 and contains object features including first object feature 1320, second object feature 1330, and third object feature 1340.

Figure 14:
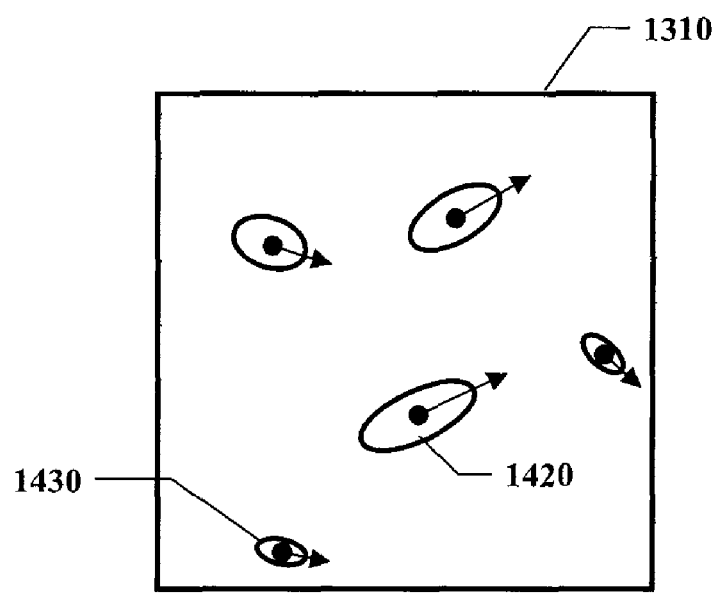
FIG. 14 shows static blob features corresponding to the object features of FIG. 13.

FIG. 14 shows the result of static feature detection using well-known connectivity analysis (also called blob analysis) to detect first static blob 1420, arising from first object feature 1320, and second static blob 1430, arising from second object feature 1330. In this illustrative embodiment the static feature detector rejects static features that fall on the edge of field of view 1310, and so no static blob is detected arising from third object feature 1340. Of course no static blobs can be detected from objects features that lie outside field of view 1310.

Static blobs in this illustrative embodiment have a center of mass, shown as a dot in the center of the blob, which includes two degrees of freedom of position. Static blobs also have area, shown as a bounding oval, and an angle of the principal axis, shown as an arrow extending from the center of mass. Static blobs can also have a weight, computed for example from area, contrast relative to the background, and/or any other suitable attribute. If weight is not used it can be considered to be 1.0 for all static blobs.

Figure 15:
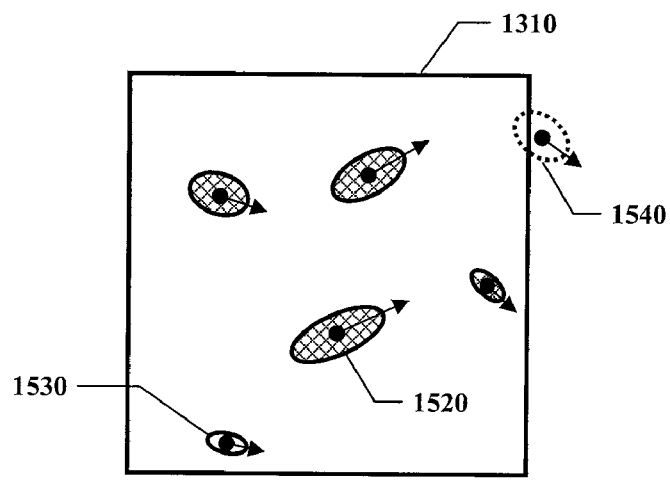
FIG. 15 shows dynamic blob features corresponding to the object features of FIG. 13.

FIG. 15 shows dynamic blobs, including first dynamic blob 1520, corresponding to first object feature 1320, second dynamic blob 1530, corresponding to second object feature 1330, and third dynamic blob 1540, corresponding to third object feature 1340. Second dynamic blob 1530 has just entered field of view 1310 and been born from second static blob 1430. Third dynamic blob 1540 is beyond the point of death and is about to die.

Figure 16:
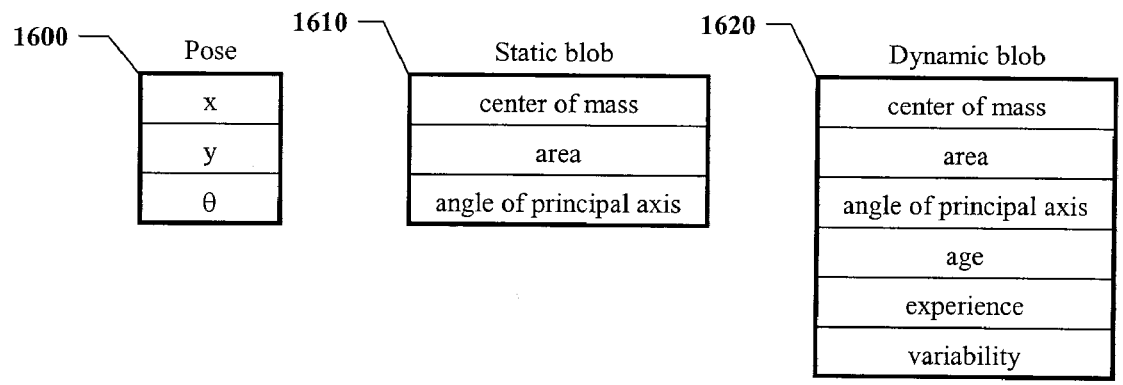
FIG. 16 shows portions of a memory storing values associated with the static and dynamic edges of FIGS. 14 and 15, as well as a three degree of freedom pose.

FIG. 16 shows portions of a memory storing values associated with the illustrative dynamic blob detection embodiment. First memory portion 1600 holds a three degree of freedom pose, comprising two degrees of freedom of position (x, y) and one of orientation (θ). Second memory portion 1610 holds a static blob, comprising center of mass, area, and angle of the principal axis. Third memory portion 1620 holds a dynamic blob, comprising center of mass, area, angle of the principal axis, age, experience, and variability.

Dynamic Feature Detection Using Predetermined Dynamic Features

In alternative embodiments a predetermined set of dynamic features is used, corresponding to objects or material of substantially known appearance. The predetermined set of dynamic features may be obtained from a training process that is responsive to a training object; from a CAD or mathematical description; or from any suitable process. For such embodiments, the dynamic feature attributes may include both expected and measured values. The expected attributes may come from predetermined information, while the measured attributes may be initialized whenever an object substantially similar in appearance to the known appearance enters the field of view, and be updated as the object moves.

Such embodiments may further include in the set of dynamic feature attributes age and variability. Objects substantially similar in appearance to the known appearance are called herein detectable objects.

Figure 17:
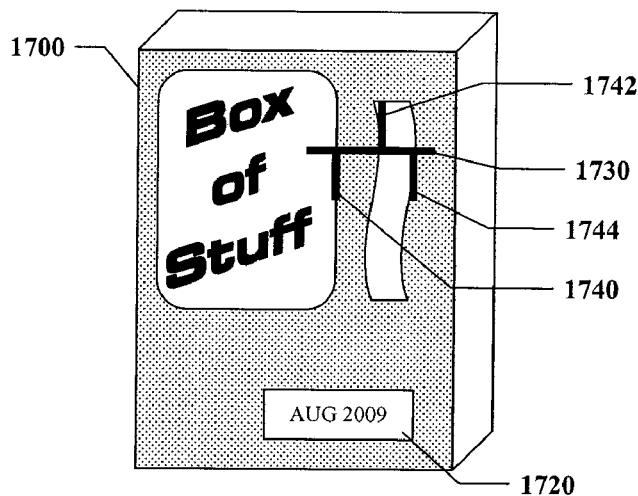
FIG. 17 shows an example training object for creating predetermined dynamic edges.

FIG. 17 shows example training object 1700 for creating predetermined dynamic features for use in detecting objects substantially similar in appearance to training object 1700. A training object can be used, for example, in an application such as that shown in FIG. 1 where detection signal 134 is to be produced for use by a printer for printing, for example, expiration date 1720. Of course the date would be printed on the objects substantially similar in appearance to training object 1700, and not necessarily on training object 1700 itself.

In an illustrative embodiment, training on a training object is accomplished by using a dynamic feature detection embodiment designed to operate on unknown objects or material. Of course the training object or material is unknown until such time as it becomes known by the training process itself. In this embodiment, dynamic feature detection on unknown objects or material is run as the training object is moved into the field of view. A signal is received to complete the training process by examining the dynamic features in existence at the time of the signal, choosing those whose attributes indicate reliability, and creating the predetermined set of dynamic features to be used for dynamic feature detection on objects substantially similar in appearance to the training object. The training object may be at rest or in motion at the time of the signal.

Reliability may be indicated by average weight, position variability, or any other suitable process or method that will occur to one of ordinary skill in the art. In an illustrative embodiment, a dynamic feature is chosen to be included in the predetermined set of dynamic features if its attributes indicate that it had a corresponding static feature in at least 90% of the images during its lifetime.

In FIG. 17 field of view 1730 is shown in a position relative to training object 1700 at the time of the signal. First dynamic edge 1740, of negative polarity, second dynamic edge 1742, of positive polarity, and third dynamic edge 1744, of negative polarity, exist at the time of the signal. Note that while these dynamic edges are shows as within field of view 1730, this is clearly not a requirement, and dynamic edges well beyond field of view 1730 can advantageously be used.

Figure 18:
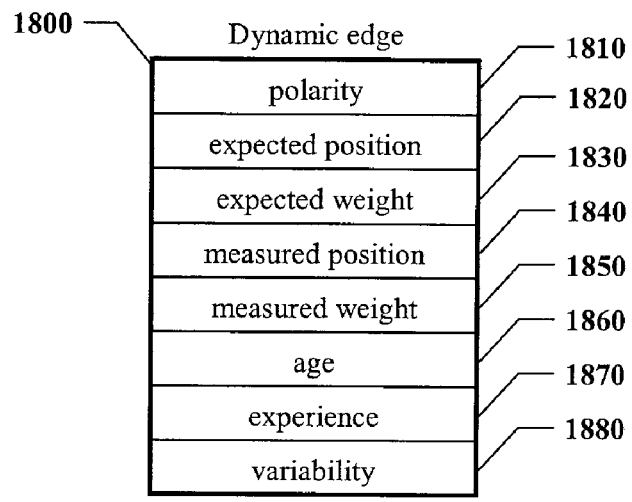
FIG. 18 shows a portion of a memory for storing a predetermined dynamic feature.

FIG. 18 shows a memory portion 1800 for storing a predetermined dynamic edge in an illustrative embodiment.

Polarity 1810, expected position 1820, and expected weight 1830 are the predetermined attributes of the dynamic edge. They are determined in advance, for example using a training process, and generally are not updated by, for example, update step 430 of FIG. 4. If a training process using a dynamic feature detection embodiment designed to operate on objects or material of substantially unknown appearance is used, for example, polarity 1810 and expected position 1820 can be taken directly from a dynamic edge in existence at the time of the training signal. Expected position 1820 can, if desired, be adjusted to be relative to some arbitrary image coordinate system, since its object coordinate at the time of the training signal is generally of no further interest—usually only relative positions of the predetermined dynamic edges matter. Expected weight 1830 can be calculated from a dynamic edge in existence at the time of the training signal by taking the ratio of experience to age.

Measured position 1840, measured weight 1850, age 1860, experience 1870, and variability 1880 are initialized and updated as further described below.

Figure 19:
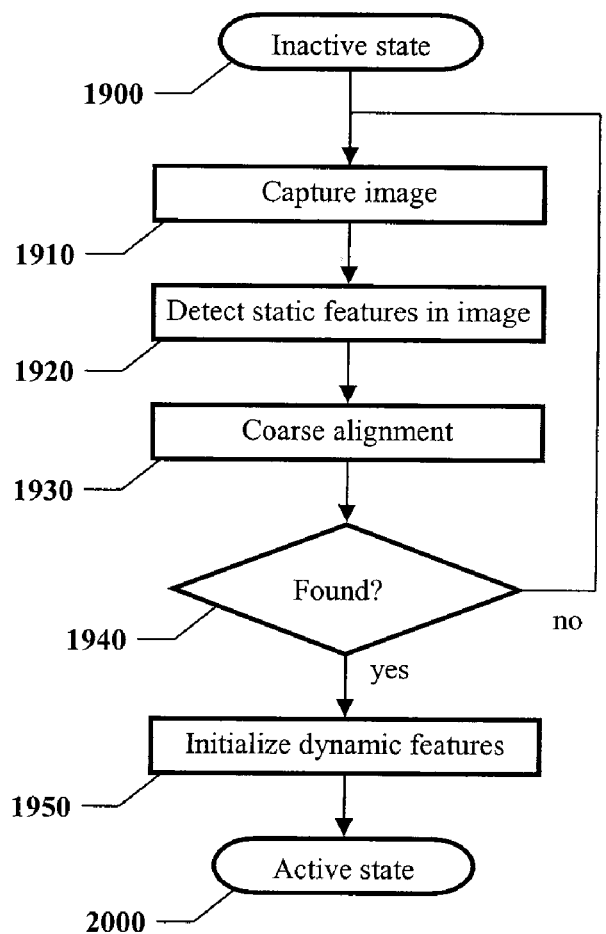
FIG. 19 shows a portion of a flowchart describing an illustrative embodiment of a method for detecting objects using predetermined dynamic features.
Figure 20:
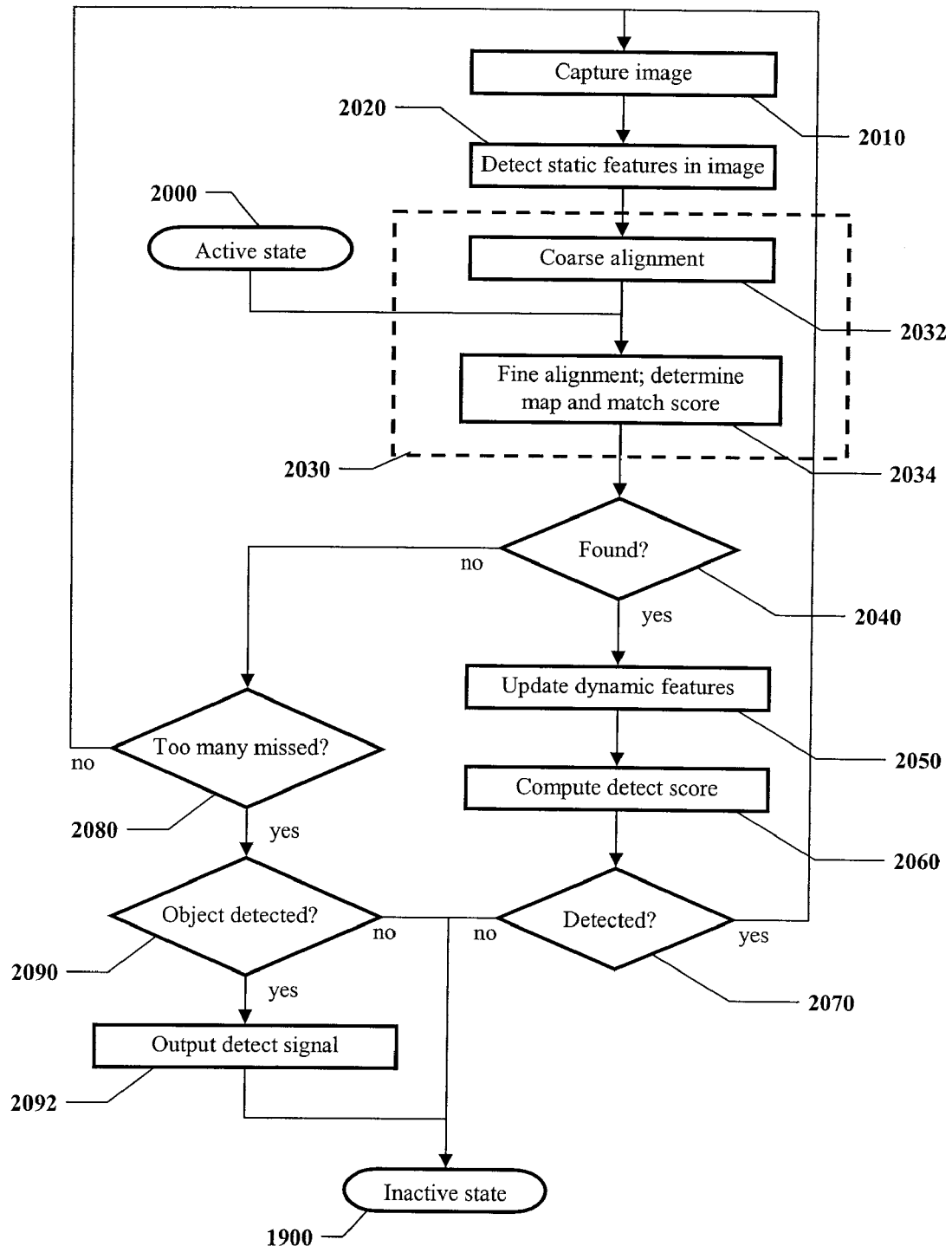
FIG. 20 shows another portion of a flowchart describing an illustrative embodiment of a method for detecting objects using predetermined dynamic features.

FIGS. 19 and 20 show a flowchart describing an illustrative embodiment of a method for detecting objects using predetermined dynamic features. The illustrated method has two major states: inactive, when there is insufficient evidence that a detectable object is in or passing through the field of view, and active, when there is some evidence that a detectable object may be in or passing through the field of view. Being in the active state does not necessarily mean that a detectable object is indeed present, but means at least that one might be and that further evidence may be needed.

FIG. 19 shows the portion of the flowchart for the inactive state. Capture step 1910 captures an image of the field of view, and static detection step 1920 detects a set of static features in the image, both as previously described.

Inactive coarse alignment step 1930 attempts to find a rough pose at which at least some, for example half, of the predetermined dynamic features have corresponding static features. In other words, inactive coarse alignment step 1930 is looking for some evidence that a detectable object has entered the field of view. In an illustrative embodiment using one dimensional images and edge features, a 1D version of the well-known generalized Hough transform is used. Typically it can be assumed that a detectable object will first appear near an edge of the field of view, but since the velocity may be unknown a relatively wide range of poses near the edges is considered, for example 10 pixels.

Inactive found test step 1940 examines the results of inactive coarse alignment step 1930 and decides whether there is some evidence that a detectable object has entered the field of view. If not, the inactive state continues at capture step 1910. If so, initialization step 1950 initializes all of the non-predetermined attributes of the dynamic features. In the illustrative embodiment of FIG. 18, for example, the non-predetermined attributes are measured position 1840, measured weight 1850, age 1860, experience 1870, and variability 1880, all of which are initialized to zero. The active state is then entered at active terminal 2000.

FIG. 20 shows the portion of the flowchart for the active state. Capture step 2010 captures an image of the field of view, and static detection step 2020 detects a set of static features in the image, both as previously described.

Analysis step 2030 analyzes the static and dynamic features to determine a map, and comprises active coarse alignment step 2032 and fine alignment step 2034. Prediction is not used in this illustrative embodiment, although it could be if desired. Active coarse alignment step 2032 is similar to inactive coarse alignment step 1930, except that a generally narrower range of poses is considered, for example±2 pixels centered on the pose of the previous captured image instead of near edges of the field of view.

Fine alignment step 2034 is similar to fine alignment as previously described, where the position of a dynamic edge is expected position 1820 and the weight is taken from experience 1870 as usual. Alternatively, weight for the fine alignment step can be taken from expected weight 1830, or can be ignored (set to 1.0). Fine alignment step 2034 also computes a match score as previously described.

Note that when the active state is entered at active terminal 2000, inactive coarse alignment step 1930 has already been run and so active coarse alignment step 2032 can be skipped for this image.

Active found test step 2040 examines the match score to decide if the map can be trusted. If it is at or above a certain accept threshold, for example 0.50, the map is trusted.

A count is kept of consecutive images for which the map was found not to be trustworthy. The count is reset to zero whenever a trustworthy map is found, and incremented otherwise. Lost test step 2080 examines this count to see if the count has reached some limit, for example 3. If not the active state continues with the next image at capture step 2010; if the limit is reached it is concluded that there is no longer sufficient evidence that a detectable object is in or passing through the field of view. It may be that a detectable object has now passed completely through the field of view, or that one was never really there in the first place. Object test step 2090 examines the most recent detect score (computed as described below) to judge between these two cases. If the detect score is at or above some detect threshold, for example 0.25, signal step 2092 outputs a detect signal indicating that an object was detected. In either case, the inactive state is entered at inactive terminal 1900.

In an alternative illustrative embodiment, the detect signal is output using the synchronization methods taught in U.S. patent application Ser. No. 10/865,155 and/or U.S. patent application Ser. No. 11/763,752, so that it can be used to precisely locate the object. The signal in this embodiment might be output before or after the inactive state is entered at inactive terminal 1900.

The count of consecutive images for which the map was found not to be trustworthy can also be used to increase the range of poses considered by active coarse alignment step 2032, because it may be desirable to look in a wider range when tracking is lost in one or more previous images. For example, the range can be increased by±1 pixel for every missed image, then reset back to its normal value once tracking is regained.

If active found test step 2040 concludes that the map can be trusted, update step 2050 uses the map to update the dynamic features. Age 1860 and experience 1870 are updated as previously described. Measured position 1840 is expected position 1820 plus the weighted average offset of all of the static edges that were found to correspond to the dynamic edge (offsets are further described in relation to FIG. 10 and map data column 1014). Measured weight 1850 is the ratio of experience to age. Variability 1880 is the standard deviation of the offsets of all of the static edges that were found to correspond to the dynamic edge. A weight variability can also be computed as the standard deviation of the weights of all those static edges. As will be appreciated by one skilled in the art, other ways of updating age, experience, measured position, measured weight, and variability may be used, and different and/or additional attributes may be used in dynamic edges.

In some embodiments for which objects or material of substantially known appearance are used, it may be desirable to compute a detect score in addition to the match score. A detect score provides a measure of confidence that a detectable object is seen, which may be different than the match score, whose primary purpose is to provide a measure of confidence in the map. For example, it may be desirable to recognize and begin to track an object when it is only partially within the field of view, before enough of it is seen to be sure that it is in fact an object of the known appearance. At such times it is desirable to have a measure of confidence in the map (the match score), but to reserve judgment on the identity of the object (detect score) until more is seen.

With such a scheme it is possible, for example, to use predetermined dynamic features that cover a much larger region of the object than the field of view. The match score is used to assess the reliability of the map as portions of the object that fit in the field of view are tracked. The detect score is derived from the state of the dynamic features and is updated as the object moves and more is learned about the appearance of the object.

In the illustrative embodiment of FIG. 20, detect score step 2060 computes a detect score from the state of the dynamic features. The detect score is equal to the smallest measured weight 1850 over all dynamic features that have passed sufficiently within the field of view, for example at least 4 pixels from an edge, and are of sufficient age, for example 8, to have reliable attributes. The effect of such a method of computing a detect score is to require that there be some evidence that all of the predetermined dynamic features that should be visible (because the object or material has moved sufficiently far into the field of view) are in fact visible. Note that a pattern matching method based on a prior art static feature detector that requires evidence that all expected features are found would rarely be practical, because its too likely that a feature would be weak or missing in any given image. But with the dynamic feature detector of the present invention, a very weak feature that may be missing from most of the images may indeed show up in the right position in at least some images, providing the necessary evidence that it exists.

Detect test step 2070 examines the detect score to decide if there is sufficient evidence that a detectable object is in or passing through the field of view. As long as all dynamic features that have passed sufficiently within the field of view and are of sufficient age have measured weight 1850 at or above some detect threshold, for example 0.25, the active state continues at capture step 2010. If it is decided that there is no longer sufficient evidence that a detectable object is in or passing through the field of view, the inactive state is entered at inactive terminal 1900.

Dynamic Spatial Calibration

In many embodiments it is desirable that the pose that maps between points on the object and points in the field of view be a linear transformation. It may be, however, that the true map between object and image space is non-linear due to a variety of fixed factors, including but not limited to lens distortion, non-orthogonal viewing angle, and curved object or material surfaces. Any or all of these factors may combine to make the true map non-linear. For example, a continuous web of material may be drawn over a portion of the curved surface of a roller, and may additionally be viewed using a lens with some geometric distortion.

It is well-known in the art to use a spatial calibration process to correct for fixed non-linear effects, so that the pose can be linear and accurate. In such a process, a calibration object containing features of a known and precise geometric arrangement is placed in the field of view of a sensor. A static feature detector determines the image coordinates of the features, and uses those measurements and the known object geometry to construct a calibration, for example a piecewise linear table that maps between image and object coordinates.

While a traditional static spatial calibration process can be used to correct fixed non-linear effects in embodiments of the present invention, such a process is limited by the accuracy of the static feature detector. Following the teachings herein, a dynamic spatial calibration method and system uses motion to achieve higher accuracy. A further advantage of the dynamic calibration method and system is that it allows using a calibration object that need not be as precisely made as for a static calibration process.

Figure 21:
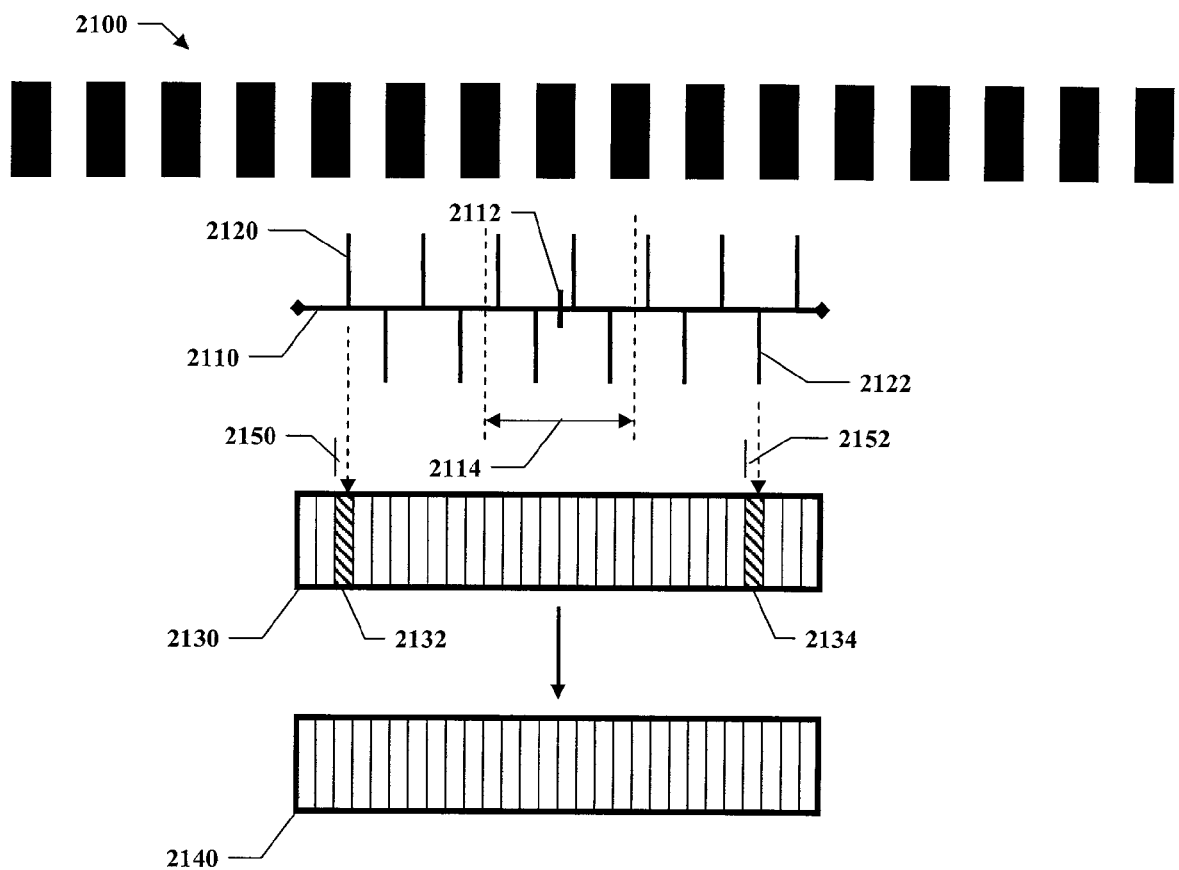
FIG. 21 shows various elements used in an illustrative system and method for dynamic spatial calibration.

FIG. 21 shows various elements used in an illustrative system and method for dynamic spatial calibration of one-dimensional images. A calibration object containing calibration features 2100 moves in field of view 2110 of a sensor. Calibration features 2100 are, in this illustrative embodiment, approximately evenly-spaced edges. Small uncorrelated errors in the position of individual edges tend to cancel out during dynamic calibration, so the calibration object can be made inexpensively simply by printing the pattern on a piece of paper using a dot-matrix or laser printer. The motion relative to the field of view can be, for example, in one direction or back and forth, and can be uniform or random. In an illustrative embodiment, back and forth motion by hand is used.

A sequence of images of field of view 2110 is captured, and a static edge detection process, for example as described in relation to FIGS. 5-7, is run on each one. FIG. 21 shows the processing of one such image. Static edges are shown along field of view 2110, including example positive static edge 2120 and example negative static edge 2122.

In the following, x will represent image coordinates and y will represent object coordinates. Let the (x, y) coordinates of center point 2112 be (0, 0).

Static edges are given an index i, numbered left to right starting with 0, so that example positive static edge 2120 has i=0 and example negative static edge 2122 has i=11. Since the spacing of the static edges is uniform in object space, $y_i=k(i-p)$, where k is an arbitrary constant and p is the "index" of center point 2112. Their image coordinate $x_i$ comes from the static edge detection process, and is in general non-uniform.

For each image, p is determined. This is accomplished in the illustrative embodiment by considering the static edges that fall within central zone 2114 of the field of view. Center point 2112 and central zone 2114 are chosen so that the mapping from image to object space in central zone 2114 is reasonably linear. Typically lens distortion is minimal near the center, for example, and in general one can achieve sufficient linearity by making the zone smaller. In an illustrative embodiment using the apparatus of FIG. 3, central zone 2114 is 20 pixels.

If fewer than a certain number of edges, for example 2, is present in central zone 2114 the image is rejected and the calibration process continues with the next image. Otherwise a linear regression of the form x=ai+b using the static edges in central zone 2114 is used to determine p, which is the value of i in the regression where x=0. Once p is known, the ($x_i$, $y_i$) coordinates of all static edges are known.

Since p changes as the calibration object moves relative to field of view 2110, the value of p can be used to determine whether the calibration object has moved since the last image. Following the reasoning described above in relation to motion test step 1130 of FIG. 11, if no motion is detected (again using some hysteresis) the image is rejected and the calibration process continues with the next image.

Field of view 2110 is divided into a number of evenly spaced bins, for example one bin per image pixel. A temporary memory 2130 holds linear regression data for each bin, including first example bin 2132 and second example bin 2134. Every static edge falls into a certain bin, and has an image space offset $u_i$ within that bin. In FIG. 21, example positive static edge 2120 falls into first example bin 2132 with offset 2150, and example negative static edge 2122 falls into second example bin 2134 with offset 2152. For each static edge, the linear regression data for the bin into which it falls is updated using a linear regression of the form $y_i=au_i+b$.

Once a sufficient number of images have been processed, the regression data in each bin are used to determine the object coordinate of the center, or alternatively the left or right end, of each bin. Those object coordinates are saved in piecewise linear calibration table 2140, after which temporary memory 2130 can be deleted. Piecewise linear calibration table 2140 can be used to transform the position of static features to values that are linear in object space for any embodiment of the invention that uses one dimensional images.

Embodiments of dynamic spatial calibration for two dimensional images and/or features other than edges can be devised by one of ordinary skill in the art. For example, dynamic calibration using two dimensional images and blob features replaces calibration features 2100 with a two-dimensional array of approximately evenly spaced blob features, central zone 2114 with a two-dimensional region in the image, temporary memory 2130 with a two-dimensional array of regression data, piecewise linear calibration table 2140 with a two-dimensional bi-linear table, and other changes that will be apparent to one of ordinary skill in the art.

For calibration features 2100, if the dark lines are of a different width than the light spaces between them then the positive edges will be approximately evenly spaced, and the negative edges will be approximately evenly spaced, but the edge-to-edge spacing will not be even. In an alternative embodiment suitable for such a case, positive and negative polarity static edges are processed separately for each image.

The foregoing has been a detailed description of various embodiments of the invention. It is expressly contemplated that a wide range of modifications, omissions, and additions in form and detail can be made hereto without departing from the spirit and scope of this invention. For example, the processors and computing devices herein are exemplary and a variety of processors and computers, both standalone and distributed can be employed to perform computations herein. Likewise, the linear array sensor described herein is exemplary and improved or differing components can be employed within the teachings of this invention. Also, some, or all, of the capture process, analysis process, and optional signaling process can be combined or parsed differently. Numerical constants used herein pertain to illustrative embodiments; any other suitable values or methods for carrying out the desired operations can be used within the scope of the invention. Accordingly, this description is meant to be taken only by way of example, and not to otherwise limit the scope of this invention.

The invention claimed is:

1. A method for measuring a plurality of object features on an object, comprising:
   providing relative motion between the object and a field of view of a sensor;
   capturing a sequence of images of the field of view;
   detecting, for each image of the sequence of images, a set of static features;
   storing in a memory a plurality of dynamic features corresponding to the plurality of object features, each dynamic feature comprising at least one measurement of a physical property of the corresponding object feature;
   analyzing, for each image of the sequence of images, the set of static features and the stored plurality of dynamic features so as to determine a map, the map comprising
   a pose that maps between points on the object and points in the image, the pose comprising at least one degree of freedom; and
   an association that maps dynamic features to corresponding static features; and
   updating at least one dynamic feature, responsive to the map, so as to improve at least one measurement of a physical property of the corresponding object feature.

2. The method of claim 1, wherein the object is of substantially unknown appearance, and further comprising creating and storing in the memory new members of the plurality of dynamic features in response to the relative motion between the object and the field of view.

3. The method of claim 2, further comprising removing dynamic features from the memory in response to the relative motion between the object and the field of view.

4. The method of claim 2, wherein
each dynamic feature further comprises an experience factor;
the analyzing is responsive to the experience factors of the dynamic features, such that at least one dynamic feature influences the determined map to an extent that increases as its experience factor increases; and
the updating is further responsive to the experience factors of the dynamic features, such that at least one dynamic feature is influenced by the determined map to an extent that decreases as its experience factor increases.

5. The method of claim 4, wherein the experience factor is responsive to a count of the images that have been captured since the dynamic feature was created.

6. The method of claim 4, wherein
each static feature comprises a weight indicating relative confidence that the static feature is responsive to an object feature; and
the experience factor is responsive to the weights of the static features to which the dynamic feature corresponds.

7. The method of claim 1, wherein the object is of substantially known appearance and the stored plurality of dynamic features are predetermined responsive to the known appearance.

8. The method of claim 7, further comprising creating the predetermined plurality of dynamic features responsive to a training object placed in the field of view.

9. The method of claim 8, wherein creating the predetermined plurality of dynamic features comprises
providing relative motion between the training object and the field of view;
capturing a second sequence of images of the field of view;
detecting, for each image of the second sequence of images, a set of training static features;
storing in a memory a plurality of training dynamic features, each training dynamic feature comprising at least one measurement of a physical property of a corresponding training object feature, and wherein the plurality of training dynamic features are not predetermined;
analyzing, for each image of the second sequence of images, the corresponding set of training static features and the stored plurality of training dynamic features so as to determine a training map, the training map comprising
a training pose that maps between points on the training object and points in the image; and
a training association that maps training dynamic features to corresponding training static features; and
updating at least one training dynamic feature, responsive to the training map, so as to improve at least one measurement of the physical property of the corresponding training object feature; and
creating the predetermined plurality of dynamic features from the plurality of training dynamic features.

10. The method of claim 7, further comprising
examining the stored plurality of dynamic features so as to determine at least one score indicating relative confidence that an object substantially similar in appearance to the known appearance is in the field of view;
using the at least one score to make a decision on whether an object substantially similar in appearance to the known appearance has been detected; and
outputting a detection signal responsive to the decision.

11. The method of any of claims 1, 2, 4, and 7, further comprising outputting a motion signal comprising information about the motion of the object, the motion signal responsive to at least one degree of freedom of the pose.

12. A system for measuring a plurality of object features on an object, comprising:
a sensor having a field of view;
a motion process that provides relative motion between the object and the field of view of the sensor;
a capture process that captures a sequence of images of the field of view;
a static feature detection process that detects, for each image of the sequence of images, a set of static features;
a memory that stores a plurality of dynamic features corresponding to the plurality of object features, each dynamic feature comprising at least one measurement of a physical property of the corresponding object feature;
an analysis process that analyzes, for each image of the sequence of images, the set of static features and the stored plurality of dynamic features so as to determine a map, the map comprising
a pose that maps between points on the object and points in the image, the pose comprising at least one degree of freedom; and
an association that maps dynamic features to corresponding static features; and
a learning process that updates at least one dynamic feature, responsive to the map, so as to improve at least one measurement of a physical property of the corresponding object feature.

13. The system of claim 12, wherein the object is of substantially unknown appearance, and further comprising a birth process that creates and stores in the memory new members of the plurality of dynamic features in response to the relative motion between the object and the field of view.

14. The system of claim 13, further comprising a death process that removes dynamic features from the memory in response to the relative motion between the object and the field of view.

15. The system of claim 13, wherein
each dynamic feature further comprises an experience factor;
the analysis process is responsive to the experience factors of the dynamic features, such that at least one dynamic feature influences the determined map to an extent that increases as its experience factor increases; and
the learning process is further responsive to the experience factors of the dynamic features, such that at least one dynamic feature is influenced by the determined map to an extent that decreases as its experience factor increases.

16. The system of claim 15, wherein the experience factor is responsive to a count of the images that have been captured since the dynamic feature was created.

17. The system of claim 15, wherein
each static feature comprises a weight indicating relative confidence that the static feature is responsive to an object feature; and
the experience factor is responsive to the weights of the static features to which the dynamic feature corresponds.

18. The system of claim 12, wherein the object is of substantially known appearance and the stored plurality of dynamic features are predetermined responsive to the known appearance.

19. The system of claim 18, further comprising a training process that creates the predetermined plurality of dynamic features responsive to a training object placed in the field of view.

20. The system of claim 19, wherein the training process comprises
- a training motion process that provides relative motion between the training object and the field of view;
- a training capture process that captures a second sequence of images of the field of view;
- a training static feature detection process that detects, for each image of the second sequence of images, a set of training static features;
- a training memory that stores a plurality of training dynamic features, each training dynamic feature comprising at least one measurement of a physical property of a corresponding training object feature, and wherein the plurality of training dynamic features are not predetermined;
- a training analysis process that analyzes, for each image of the second sequence of images, the corresponding set of training static features and the stored plurality of training dynamic features so as to determine a training map, the training map comprising
  - a training pose that maps between points on the training object and points in the image; and
  - a training association that maps training dynamic features to corresponding training static features; and
- a training learning process that updates at least one training dynamic feature, responsive to the training map, so as to improve at least one measurement of the physical property of the corresponding training object feature; and
- a selection process that creates the predetermined plurality of dynamic features from the plurality of training dynamic features.

21. The system of claim 18, further comprising
- a detection process that examines the stored plurality of dynamic features so as to determine at least one score indicating relative confidence that an object substantially similar in appearance to the known appearance is in the field of view;
- a decision process that uses the at least one score to make a decision on whether an object substantially similar in appearance to the known appearance has been detected; and
- a signaling process that outputs a detection signal responsive to the decision.

22. The system of any of claims 12, 13, 15, and 18, further comprising a signaling process that outputs a motion signal comprising information about the motion of the object, the motion signal responsive to at least one degree of freedom of the pose.

* * * * *